(12) United States Patent
Shibamiya et al.

(10) Patent No.: US 8,102,579 B2
(45) Date of Patent: Jan. 24, 2012

(54) IMAGE PROCESSING APPARATUS, CONTROL METHOD OF IMAGE PROCESSING APPARATUS, PROGRAM AND STORAGE MEDIUM

(75) Inventors: Yoshikazu Shibamiya, Tokyo (JP); Yuichi Matsumoto, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 362 days.

(21) Appl. No.: 11/831,010

(22) Filed: Jul. 31, 2007

(65) Prior Publication Data

US 2008/0037081 A1 Feb. 14, 2008

(30) Foreign Application Priority Data

Aug. 14, 2006 (JP) .................................. 2006-221245
Jul. 24, 2007 (JP) .................................. 2007-192651

(51) Int. Cl.
*H04N 1/46* (2006.01)
(52) U.S. Cl. ........ 358/540; 715/723; 715/716; 715/700; 715/732; 715/730; 348/571; 348/575
(58) Field of Classification Search .................. 358/540; 715/723, 716, 700, 732, 730, 731; 348/571, 348/575

See application file for complete search history.

(56) References Cited

U.S. PATENT DOCUMENTS

| | | | |
|---|---|---|---|
| 5,596,346 A * | 1/1997 | Leone et al. .................. | 345/667 |
| 6,317,141 B1 * | 11/2001 | Pavley et al. .................. | 715/732 |
| 6,369,835 B1 * | 4/2002 | Lin .............................. | 715/726 |
| 2003/0101237 A1 | 5/2003 | Ban et al. ...................... | 709/218 |
| 2005/0154637 A1 * | 7/2005 | Nair et al. ....................... | 705/14 |
| 2006/0050086 A1 * | 3/2006 | Ono .............................. | 345/629 |

FOREIGN PATENT DOCUMENTS

JP 2003-196283 7/2003

* cited by examiner

*Primary Examiner* — Benny Tieu
*Assistant Examiner* — Paul F Payer
(74) *Attorney, Agent, or Firm* — Fitzpatrick, Cella, Harper & Scinto

(57) ABSTRACT

During a display of a slideshow of a composite image comprising a plurality of images, a user operates a print bookmark, resulting in composite images and individual images that can be printed being set and stored as print candidate images. By displaying, in a list, stored candidate images on a display unit as print candidate images, an image processing apparatus is provided which enables the user to specify a desired image for printing.

3 Claims, 23 Drawing Sheets

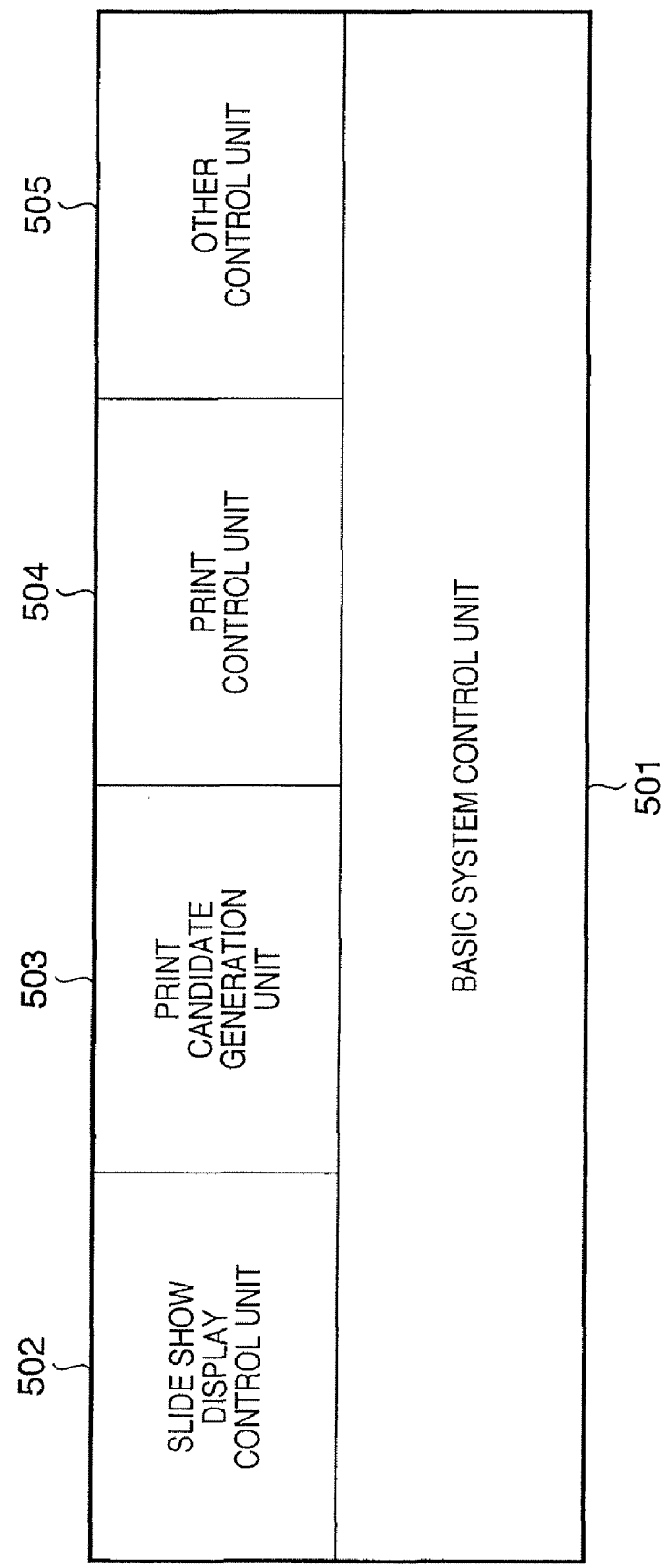

FIG. 6A

| | | |
|---|---|---|
| DISPLAY FORMAT | EVERY ONE SHEET / TWO STRIPS / FOUR STRIPS / RANDOMLY SUPERIMPOSED | 601 |
| DISPLAY INTERVAL | 3sec (1~99sec) | |
| DISPLAY ORDER | FILE NAME ORDER / DATE AND HOUR ORDER / RANDOM | |
| TRANSITION EFFECT | SLIDE-IN / DISSOLVE / WIPE / | |
| PRINT MODE | PRINT CANDIDATE SELECTION MODE 1 / PRINT CANDIDATE SELECTION MODE 2 / DIRECT PRINTING | |

FIG. 6B

| FILE NAME | STORAGE LOCATION | DISPLAY ORDER | EXTRACTION POSITION | EXTRACTION SIZE | OVERLAP | DISPLAY POSITION | ROTATION ANGLE | MAGNI-FICATION |
|---|---|---|---|---|---|---|---|---|
| pic_A | ¥Data¥DC | 1 | u1, v1 | s1, t1 | 0 | X1, Y1 | Z1 | 1.00 |
| pic_B | ¥Data¥DC | 2 | u2, v2 | s1, t2 | 0 | X1, Y2 | Z2 | 1.00 |
| pic_C | ¥Data¥DC | 3 | u3, v3 | s1, t3 | 0 | X1, Y3 | Z3 | 1.00 |
| pic_C | ¥Data¥DC | 4 | u4, v4 | s1, t4 | 0 | X1, Y4 | Z4 | 1.00 |
| pic_D | ¥Data¥DC | 5 | u5, v5 | s1, t5 | 0 | X1, Y5 | Z5 | 1.00 |
| pic_E | ¥Data¥DC | 6 | u6, v6 | s1, t6 | 0 | X1, Y6 | Z6 | 1.00 |
| pic_F | ¥Data¥DC | 7 | u7, v7 | s1, t7 | 0 | X1, Y7 | Z7 | 1.00 |
| .. | .. | .. | .. | .. | .. | .. | .. | .. |
| pic_I | ¥Data¥DC | i | ui, vi | si, ti | 0 | Xi, Yi | Zi | 1.00 |
| .. | .. | .. | .. | .. | .. | .. | .. | .. |
| pic_N | ¥Data¥DC | N | uN, vN | sN, tN | 0 | XN, YN | ZN | 1.00 |

| | | |
|---|---|---|
| DISPLAY FORMAT | FOUR STRIPS | 701 |
| DISPLAY INTERVAL | 3sec | |
| DISPLAY ORDER | FILE NAME ORDER | |
| TRANSITION EFFECT | SLIDE-IN | |
| PRINT MODE | PRINT CANDIDATE SELECTION MODE 1 | |

| | FILE NAME | STORAGE LOCATION | DISPLAY ORDER | EXTRACTION POSITION | EXTRACTION SIZE | OVERLAP | DISPLAY POSITION | ROTATION ANGLE | MAGNIFICATION | DISPLAY CHANGE | DISPLAY CONDITION |
|---|---|---|---|---|---|---|---|---|---|---|---|
| D1 | pic_A | ¥Data¥DC | 1 | u1,v1 | s1,t1 | X | X | X | 1.00 | C | H |
| D2 | pic_A | ¥Data¥DC | 1 | u1,v1 | s1,t1 | X | X | X | 1.00 | F | V |
| D3 | pic_A | ¥Data¥DC | 1 | u1,v1 | s1,t1 | X | X | X | 1.00 | F | V |
|    | pic_B | ¥Data¥DC | 2 | u2,v2 | s2,t2 | X | X | X | 1.00 | C | H |
| D4 | pic_A | ¥Data¥DC | 1 | u1,v1 | s1,t1 | X | X | X | 1.00 | F | V |
|    | pic_B | ¥Data¥DC | 2 | u2,v2 | s2,t2 | X | X | X | 1.00 | F | V |
| D5 | pic_A | ¥Data¥DC | 1 | u1,v1 | s1,t1 | X | X | X | 1.00 | F | V |
|    | pic_B | ¥Data¥DC | 2 | u2,v2 | s2,t2 | X | X | X | 1.00 | F | V |
|    | pic_C | ¥Data¥DC | 3 | u3,v3 | s3,t3 | X | X | X | 1.00 | C | H |
| D6 | pic_A | ¥Data¥DC | 1 | u1,v1 | s1,t1 | X | X | X | 1.00 | F | V |
|    | pic_B | ¥Data¥DC | 2 | u2,v2 | s2,t2 | X | X | X | 1.00 | F | V |
|    | pic_C | ¥Data¥DC | 3 | u3,v3 | s3,t3 | X | X | X | 1.00 | F | V |
| D7 | pic_A | ¥Data¥DC | 1 | u1,v1 | s1,t1 | X | X | X | 1.00 | C | V |
|    | pic_B | ¥Data¥DC | 2 | u2,v2 | s2,t2 | X | X | X | 1.00 | F | V |
|    | pic_C | ¥Data¥DC | 3 | u3,v3 | s3,t3 | X | X | X | 1.00 | F | V |
|    | pic_D | ¥Data¥DC | 4 | u4,v4 | s4,t4 | X | X | X | 1.00 | F | V |
|    | pic_E | ¥Data¥DC | 5 | u5,v5 | s5,t5 | X | X | X | 1.00 | C | H |
| D8 | pic_B | ¥Data¥DC | 2 | u2,v2 | s2,t2 | X | X | X | 1.00 | F | V |
|    | pic_C | ¥Data¥DC | 3 | u3,v3 | s3,t3 | X | X | X | 1.00 | F | V |
|    | pic_D | ¥Data¥DC | 4 | u4,v4 | s4,t4 | X | X | X | 1.00 | F | V |
|    | pic_E | ¥Data¥DC | 5 | u5,v5 | s5,t5 | X | X | X | 1.00 | F | V |
| D9 | pic_B | ¥Data¥DC | 2 | u2,v2 | s2,t2 | X | X | X | 1.00 | C | V |
|    | pic_C | ¥Data¥DC | 3 | u3,v3 | s3,t3 | X | X | X | 1.00 | F | V |
|    | pic_D | ¥Data¥DC | 4 | u4,v4 | s4,t4 | X | X | X | 1.00 | F | V |
|    | pic_E | ¥Data¥DC | 5 | u5,v5 | s5,t5 | X | X | X | 1.00 | F | V |
|    | pic_F | ¥Data¥DC | 6 | u6,v6 | s6,t6 | X | X | X | 1.00 | C | H |
| D10 | pic_C | ¥Data¥DC | 3 | u3,v3 | s3,t3 | X | X | X | 1.00 | F | V |
|    | pic_D | ¥Data¥DC | 4 | u4,v4 | s4,t4 | X | X | X | 1.00 | F | V |
|    | pic_E | ¥Data¥DC | 5 | u5,v5 | s5,t5 | X | X | X | 1.00 | F | V |
|    | pic_F | ¥Data¥DC | 6 | u6,v6 | s6,t6 | X | X | X | 1.00 | F | V |

FIG. 8A

| DISPLAY FORMAT | RANDOMLY SUPERIMPOSED |
| --- | --- |
| DISPLAY INTERVAL | 3sec |
| DISPLAY ORDER | FILE NAME ORDER |
| TRANSITION EFFECT | DISSOLVE |
| PRINT MODE | PRINT CANDIDATE SELECTION MODE 2 |

| | FILE NAME | STORAGE LOCATION | DISPLAY ORDER | EXTRACTION POSITION | EXTRACTION SIZE | OVERLAP | DISPLAY POSITION | ROTATION ANGLE | MAGNIFICATION | DISPLAY CHANGE | DISPLAY CONDITION |
|---|---|---|---|---|---|---|---|---|---|---|---|
| D'1 | pic_A | ¥Data¥DC | 1 | X | X | X | x1,y1 | z1 | k1 | F | V |
|  | pic_B | ¥Data¥DC | 2 | X | X | X | x2,y2 | z2 | k2 | F | V |
| D'2 | pic_A | ¥Data¥DC | 1 | X | X | X | x1,y1 | z1 | k1 | F | V |
|  | pic_B | ¥Data¥DC | 2 | X | X | <C | x2,y2 | z2 | k2 | C | V |
|  | pic_C | ¥Data¥DC | 3 | X | X | >B | x3,y3 | z3 | k3 | C | V |
| D'3 | pic_A | ¥Data¥DC | 1 | X | X | X | x1,y1 | z1 | k1 | F | V |
|  | pic_B | ¥Data¥DC | 2 | X | X | <C | x2,y2 | z2 | k2 | F | V |
|  | pic_C | ¥Data¥DC | 3 | X | X | >B | x3,y3 | z3 | k3 | F | V |
| D'4 | pic_A | ¥Data¥DC | 1 | X | X | <D | x1,y1 | z1 | k1 | C | V |
|  | pic_B | ¥Data¥DC | 2 | X | X | <C,<D | x2,y2 | z2 | k2 | C | V |
|  | pic_C | ¥Data¥DC | 3 | X | X | >B | x3,y3 | z3 | k3 | F | V |
|  | pic_D | ¥Data¥DC | 4 | X | X | >A,>B | x4,y4 | z4 | k4 | C | V |
| D'5 | pic_A | ¥Data¥DC | 1 | X | X | <D | x1,y1 | z1 | k1 | F | V |
|  | pic_B | ¥Data¥DC | 2 | X | X | <C,<D | x2,y2 | z2 | k2 | F | V |
|  | pic_C | ¥Data¥DC | 3 | X | X | >B | x3,y3 | z3 | k3 | F | V |
|  | pic_D | ¥Data¥DC | 4 | X | X | >A,>B | x4,y4 | z4 | k4 | F | V |
| D'6 | pic_A | ¥Data¥DC | 1 | X | X | <D,<E | x1,y1 | z1 | k1 | C | H |
|  | pic_B | ¥Data¥DC | 2 | X | X | <C,<D | x2,y2 | z2 | k2 | F | V |
|  | pic_C | ¥Data¥DC | 3 | X | X | >B | x3,y3 | z3 | k3 | F | V |
|  | pic_D | ¥Data¥DC | 4 | X | X | >A,>B,<E | x4,y4 | z4 | k4 | C | H |
|  | pic_E | ¥Data¥DC | 5 | X | X | >A,>D | x5,y5 | z5 | k5 | C | V |
| D'7 | pic_A | ¥Data¥DC | 1 | X | X | <D,<E | x1,y1 | z1 | k1 | F | H |
|  | pic_B | ¥Data¥DC | 2 | X | X | <C,<D | x2,y2 | z2 | k2 | F | V |
|  | pic_C | ¥Data¥DC | 3 | X | X | >B | x3,y3 | z3 | k3 | F | V |
|  | pic_D | ¥Data¥DC | 4 | X | X | >A,>B,<E | x4,y4 | z4 | k4 | F | H |
|  | pic_E | ¥Data¥DC | 5 | X | X | >A,>D | x5,y5 | z5 | k5 | F | V |

| | FILE NAME | STORAGE LOCATION | DISPLAY ORDER | EXTRACTION POSITION | EXTRACTION SIZE | OVERLAP | DISPLAY POSITION | ROTATION ANGLE | MAGNIFICATION | DISPLAY CHANGE | DISPLAY CONDITION |
|---|---|---|---|---|---|---|---|---|---|---|---|
| D'8 | pic_A | ¥Data¥DC | 1 | X | X | <D,<E,<F | x1,y1 | z1 | k1 | F | H |
| | pic_B | ¥Data¥DC | 2 | X | X | <C,<D,<F | x2,y2 | z2 | k2 | F | H |
| | pic_C | ¥Data¥DC | 3 | X | X | >B,<F | x3,y3 | z3 | k3 | F | H |
| | pic_D | ¥Data¥DC | 4 | X | X | >A,>B,<E,<F | x4,y4 | z4 | k4 | F | H |
| | pic_E | ¥Data¥DC | 5 | X | X | >A,>D,<F | x5,y5 | z5 | k5 | F | V |
| | pic_F | ¥Data¥DC | 6 | X | X | >A,>B,>C,>D,>E | x6,y6 | z6 | k6 | F | V |
| D'9 | pic_A | ¥Data¥DC | 1 | X | X | <D,<E,<F | x1,y1 | z1 | k1 | F | H |
| | pic_B | ¥Data¥DC | 2 | X | X | <C,<D,<F | x2,y2 | z2 | k2 | F | H |
| | pic_C | ¥Data¥DC | 3 | X | X | >B,<F | x3,y3 | z3 | k3 | F | H |
| | pic_E | ¥Data¥DC | 5 | X | X | >A,>D,<F,<G | x5,y5 | z5 | k5 | F | V |
| | pic_F | ¥Data¥DC | 6 | X | X | >A,>B,>C,>D,>E,<G | x6,y6 | z6 | k6 | F | V |
| | pic_G | ¥Data¥DC | 7 | X | X | >D,>E,>F | x7,y7 | z7 | k7 | F | V |
| D'10 | pic_A | ¥Data¥DC | 1 | X | X | <D,<E,<F,<H | x1,y1 | z1 | k1 | F | H |
| | pic_B | ¥Data¥DC | 2 | X | X | <C,<D,<F | x2,y2 | z2 | k2 | F | H |
| | pic_C | ¥Data¥DC | 3 | X | X | >B,<F | x3,y3 | z3 | k3 | F | H |
| | pic_E | ¥Data¥DC | 5 | X | X | >A,>D,<F,<G,<H | x5,y5 | z5 | k5 | F | H |
| | pic_F | ¥Data¥DC | 6 | X | X | >A,>B,>C,>D,>E,<G,<H | x6,y6 | z6 | k6 | F | V |
| | pic_G | ¥Data¥DC | 7 | X | X | >D,>E,>F,<H | x7,y7 | z7 | k7 | F | V |
| | pic_H | ¥Data¥DC | 8 | X | X | >A,>D,>E,>F,>G | x8,y8 | z8 | k8 | F | V |
| D'11 | pic_A | ¥Data¥DC | 1 | X | X | <D,<E,<F,<H | x1,y1 | z1 | k1 | F | H |
| | pic_B | ¥Data¥DC | 2 | X | X | <C,<D,<F,<I | x2,y2 | z2 | k2 | F | H |
| | pic_C | ¥Data¥DC | 3 | X | X | >B,<F,<I | x3,y3 | z3 | k3 | F | H |
| | pic_E | ¥Data¥DC | 5 | X | X | >A,>D,<F,<G,<H | x5,y5 | z5 | k5 | F | H |
| | pic_F | ¥Data¥DC | 6 | X | X | >A,>B,>C,>D,>E,<G,<H,<I | x6,y6 | z6 | k6 | F | H |
| | pic_G | ¥Data¥DC | 7 | X | X | >D,>E,>F,<H | x7,y7 | z7 | k7 | F | V |
| | pic_H | ¥Data¥DC | 8 | X | X | >A,>D,>E,>F,>G | x8,y8 | z8 | k8 | F | V |
| | pic_I | ¥Data¥DC | 9 | X | X | >B,>C,>F | x9,y9 | z9 | k9 | F | V |

IMAGE PROCESSING APPARATUS, CONTROL METHOD OF IMAGE PROCESSING APPARATUS, PROGRAM AND STORAGE MEDIUM

BACKGROUND OF THE INVENTION

1. Field of the Invention

The present invention relates to an image processing apparatus handling composite images each comprising a plurality of images, control method of an image processing apparatus, program, and storage medium.

2. Description of the Related Art

Recently, as a result of the popularization of digital cameras, opportunities to view image data shot by a digital camera at home on a personal computer, television receiving machine, etc., are increasing. In this case, as a viewing method, there is proposed displaying a single image data selected by a user, or displaying a slideshow display of a plurality of image data which are successively shown and switched at a predetermined time.

Further, recently, there is proposed displaying a slideshow display having complicated display functions such as simultaneously displaying, switching, superimposing, etc., a plurality of image data as a method of displaying image data in a slideshow display. In Japanese Patent Laid-Open No. 2003-196283, there is disclosed an invention relating to an image forming program in which it is possible to display an image data and partial image data resulting from extraction of one part of the image data, and perform printing. However, in this invention disclosed in Japanese Patent Laid-Open No. 2003-196283, an image data region that does not change and is fixed is specified, and the region is displayed on a display apparatus or recorded in a printing medium.

In addition, in the case that a plurality of image data is simultaneously displayed, there is already proposed specifying image data in a still state and displaying or printing the image data.

In a slideshow display having complicated display functions such as simultaneously displaying, switching, superimposing, etc., a plurality of image data as a method of displaying image data in a slideshow display, it is desirable that it is possible to specify and display specific image data, and print the image data. That is, specifying images to be printed is made easier even when a user is in the middle of executing a slideshow display, if it is possible to display or print a particular image data by specifying the image data from among a plurality of image data included in the slideshow display. In this case, convenience to a user is increased if it is possible to specify an image data even when the image data is changing dynamically.

SUMMARY OF THE INVENTION

Therefore, the object of the present invention is to provide a system which makes it possible to specify a particular image data from a composite image data comprising a plurality of image data, and to enable displaying and printing of the specified particular image data.

According to an aspect of the present invention, there is provided an image processing apparatus, comprising: a display control unit configured to display on the display apparatus a composite image comprising a plurality of images while dynamically changing the plurality of images; an receiving unit configured to receive output commands during displaying of the composite image on the display apparatus by the display control unit; and a selection unit configured to display, so that a user can select as an image to be output, either the composite image at a timing before or after a timing at which the output command has been received by the receiving unit.

According to another aspect of the present invention, there is provided a control method of an image processing apparatus, comprising: controlling step of controlling a composite image comprising a plurality of images by displaying on a display apparatus while dynamically changing the plurality of images; receiving step of receiving an output command from a user while displaying the composite image on the display apparatus by the controlling step; and selecting step of displaying the composite images at a timing before and after the timing at which the output command has been received by the receiving step so that a user can select either one of the composite images as an image to be output.

In order to achieve the above object of the present invention, still another embodiment of the present invention provides a computer-executable program describing a processing procedure of a control method of the image processing apparatus.

In order to achieve the above object of the present invention, yet another embodiment of the present invention provides a computer-readable storage medium in which a program describing a processing procedure of a method of controlling the image processing apparatus is stored.

The present invention enables specifying a particular image data from a composite image data comprising a plurality of image data, and to enable displaying and printing of the specified particular image data.

Further features of the present invention will become apparent from the following description of exemplary embodiments with reference to the attached drawings.

BRIEF DESCRIPTION OF THE DRAWINGS

FIG. 5 is a diagram showing a hierarchical structure of software of a system control unit used according to an embodiment of the present invention.

FIGS. 6A and 6B are diagrams showing a display data table used according to an embodiment of the present invention.

FIGS. 7A-7C are display state tables and diagrams showing display states in a strip-shaped type slideshow display executed according to an embodiment of the present invention.

FIGS. 8A-8D are display state tables and diagrams showing display states in a randomly superimposing type slideshow display executed according to an embodiment of the present invention.

DESCRIPTION OF THE EMBODIMENTS

An image processing apparatus according to an embodiment of the present invention will be described below using a television broadcast receiving apparatus (hereinafter referred to as TV receiving apparatus) 100 as an example.

Figure 1:
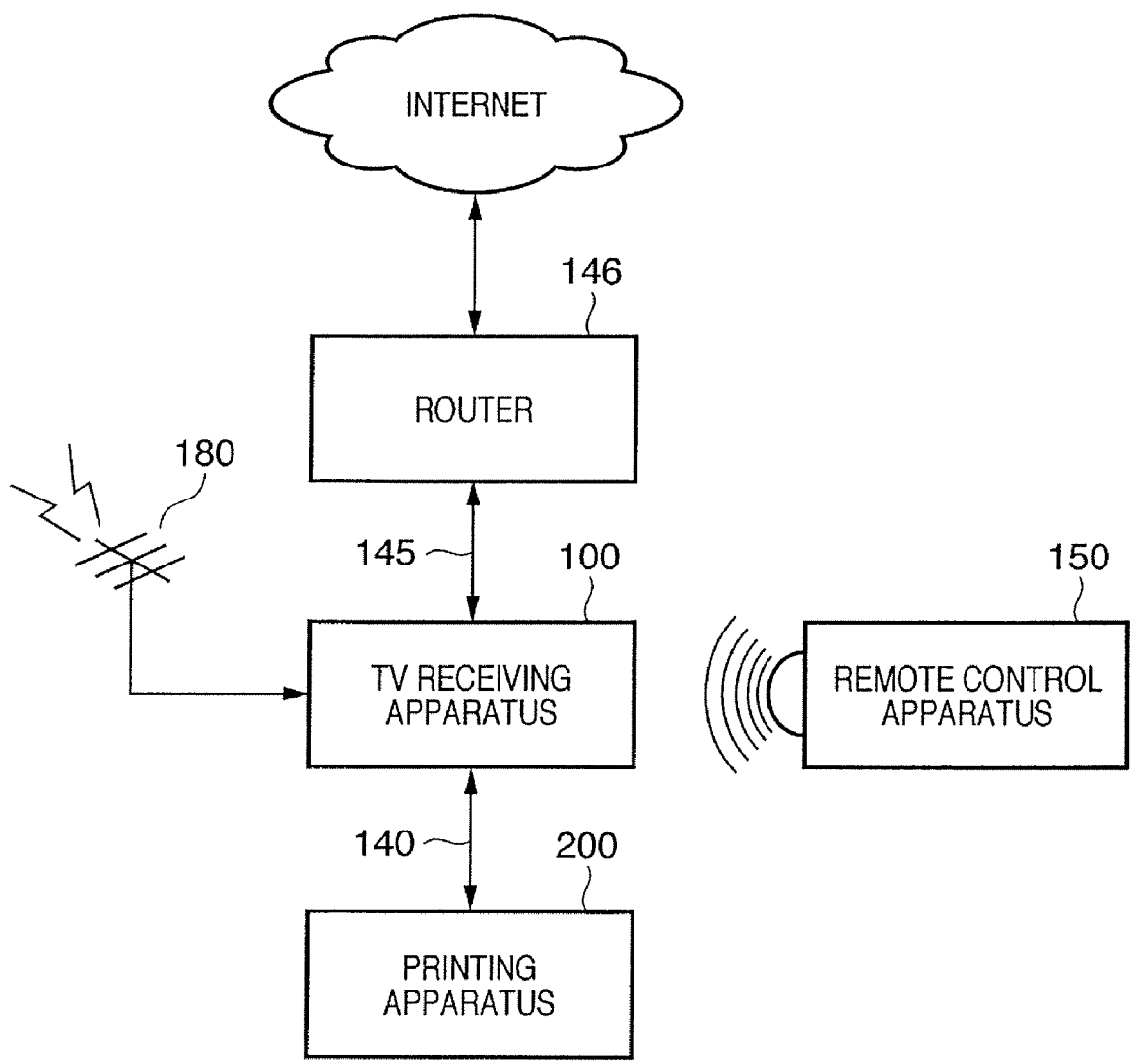
FIG. 1 is a diagram showing the entire system configuration of a composite image processing apparatus according to an embodiment of the present invention.

FIG. 1 is a schematic view of a system in which a printing apparatus 200 is connected to a TV receiving apparatus 100, which is an image processing apparatus according to a first embodiment of the present invention. The TV receiving apparatus 100 has an antenna 180, receives a broadcast signal from a broadcast station, and obtains a video signal, audio signal, and other information signals. Then, the video signal, audio signal, and other information signals are output to a display unit 110 (details described below) of an LCD panel, CRT, etc., as well as an audio output unit 111 such as a speaker. Basically, the TV receiving apparatus 100 performs various controls by receiving signals from a remote control apparatus 150. Of course, it is possible, depending on the situation, to receive a broadcast signal of a broadcast station from a cable of a cable TV company without using an antenna 180.

In addition, a display unit 110 displays not only broadcasted video, but also video signals of other AV devices and image signals accumulated in a memory described later, as well as a user interface of a variety of controls using a remote control apparatus 150. Therefore, the display unit 110 is used as a user interface when carrying out printing control by the printing apparatus 200 which has been connected. The TV receiving apparatus 100 and the printing apparatus 200 are linked by a USB cable 140. Implementation of linking of a TV receiving apparatus 100 and a printing apparatus 200 is possible under both wired and wireless conditions. A USB connection is possible in the case of a wired connection, while a wireless LAN connection or IR communication connection is possible in the case of a wireless connection. In the diagrammed example, the TV receiving apparatus 100 and the printing apparatus 200 are connected with the USB cable 140. In addition, the TV receiving apparatus 100 is connected to the Internet via a network cable 145 and a router 146. Therefore, the TV receiving apparatus 100 is configured so that information on the Internet can also be viewed. In addition, the printing apparatus 200 can also be connected to the TV receiving apparatus 100 via the network cable 145.

Figure 2:
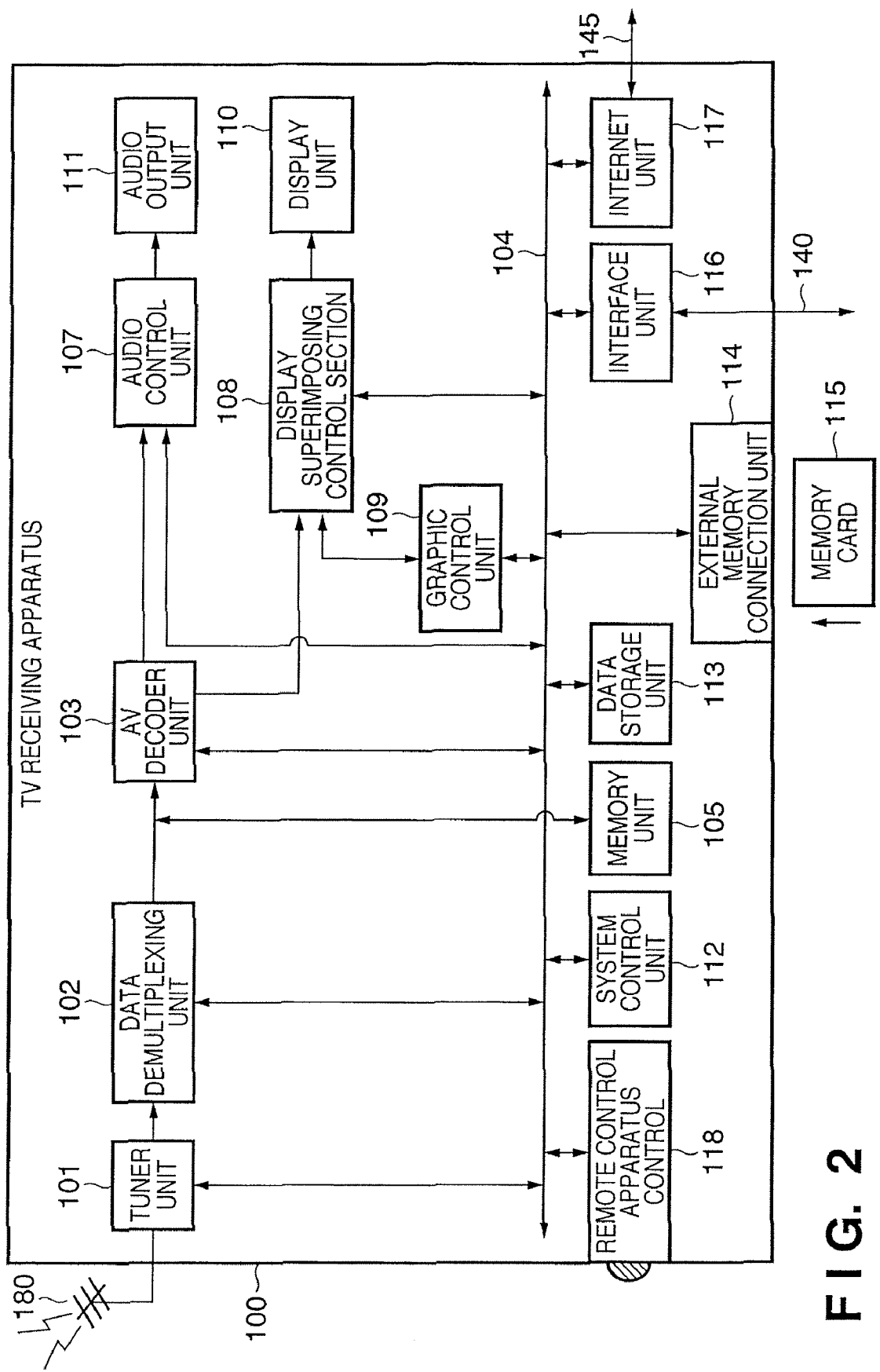
FIG. 2 is a block diagram showing a TV receiving apparatus used in a composite image processing apparatus according to an embodiment of the present invention.

Next, a circuit block of the TV receiving apparatus 100 will be described in detail with reference to the function block diagram in FIG. 2. FIG. 2 is a functional block diagram, configured as the first embodiment of the present invention, showing a circuit configuration of the TV receiving apparatus 100. In FIG. 2, reference numeral 101 is a tuner unit which amplifies a high-frequency signal of a received television broadcast (hereinafter referred to as TV broadcast), performs selection of a broadcast channel desired to be received, performs demodulation, and outputs TS data in which video/audio program data, various data, etc., have been mixed.

In addition, reference numeral 102 is a data demultiplexing unit, which demultiplexes TS data that has been output from the tuner unit 101 into video/audio program data, program information data described below, data for data broadcasting (data broadcast content, various metadata, control documents, and other data for data broadcasting), etc. Demultiplexed video/audio program data is supplied to an AV decoder unit 103 described below, and other program information data and data for data broadcasting are output to a memory unit 105 through an internal bus 104.

The AV decoder unit 103 decodes video/audio program data supplied from the data demultiplexing unit 102, and video/audio data encoded in MPEG, etc., supplied from the memory unit 105 through the internal bus 104.

Audio data which has been output from the AV decoder unit 103 is supplied to an audio control unit 107, and, after being mixed with other audio data if required, the audio data is output from the audio output unit 111 as audio. In addition, video data output from the AV decoder unit 103 is displayed on the display unit 110 after being composed with other video data, character data, graphic data, etc., which are to be superimposed, in a display superimposing control section 108.

In the audio control unit 107, audio data from the AV decoder unit 103 and audio data from the internal bus 104 are switched or composed and output to the audio output unit 111 after controlling volume, sound quality, realistic feeling, etc.

In the display superimposing control section 108, video program data from the AV decoder unit 103 and image data of a digital camera, etc., generated in a graphic control unit 109, are processed based on control by a system control unit 112. That is, the display superimposing control section 108 performs switching, composition, enlargement/reduction, and various other conversions and corrections on a plurality of image data, and outputs to the display unit 110.

The graphic control unit 109 generates, based on control by the system control unit 112 described below, GUI screens, etc., such as a data broadcast screen, an screen of an application, installed in inside the TV receiving apparatus 100, for viewing a digital camera, and a message.

The display unit 110 displays a video/image data output from the display superimposing control section 108, and includes a display apparatus having, for example, a large screen and a high picture quality by having a resolution of 1920×1080 pixels, a frame rate of 60 Hz, and a size of 50 inches.

The memory unit 105 performs temporary storage, etc., of data broadcast content, program information data, etc., demultiplexed by the data demultiplexing unit 102. Further, the memory unit 105 performs a slideshow display or temporary storage, etc., of expansion data of a digital camera image for printing, a display data table, a display state table, a print candidate buffer, and other control data in the TV receiving apparatus 100. In addition, the memory unit 105 can also be used as work memory by the system control unit 112 in order to execute programs.

Reference numeral 113 is a data accumulation unit, which comprises, for example, an HDD apparatus, and which is also used to store received video/audio program data, image data of a digital camera accumulated in a memory card 115, and so on. In addition, a print candidate list serving as a print candidate specified for printing during a slideshow display (hereinafter referred to as printing bookmark) is also stored in the data accumulation unit 113. Also, a plurality of display data, etc., starting with an OSD (On Screen Display) and a GUI (Graphical User Interface) are stored in the data accumulation unit 113.

Reference numeral 116 is an interface unit connecting the printing apparatus 200, and transferring data to the printing apparatus 200 when performing printing of various data.

Reference numeral 114 is an external memory connection unit comprising a connector unit for connecting the memory card 115 of a digital camera, etc.

The memory card 115 comprises a non-volatile memory of a semiconductor used for the accumulation of image data of a digital camera, etc., and has accumulated on it image data of a digital camera, etc., for performing a slideshow display or printing in the TV receiving apparatus 100.

Reference numeral 117 is an Internet connection unit, and, for example, connects to the Internet via the router 146, and performs transmission and reception of various data by connecting to a broadcast station server, accounting server, etc. Of course, it is possible to view, etc., other various information on the Internet.

Reference numeral 118 is a remote control apparatus control unit which performs remote control transmission and reception using infrared light with a remote control apparatus 150, and transfers the received data to the system control unit 112.

The system control unit 112 has overall control over each unit inside the TV receiving apparatus 100. The system control unit 112 comprises a CPU, main storage memory, bus control unit, program storage memory, parameter storage memory, ID storage memory, clock unit, timer unit, etc. In addition, the tuner unit 101 performs switching of a receiving channel through control of the data demultiplexing unit 102, and exerts control so that signals from a desired broadcast station are received.

In addition, the system control unit 112 demultiplexes video/audio program data, program information, data for data broadcasting, etc., and, while displaying a program, generates data broadcast and EPG (Electronic Program Guide) data. Further, the system control unit 112 controls the graphic control unit 109, and controls so that display of data broadcast, EPG, etc., is performed. In addition, the system control unit 112 reads out image data of a digital camera, etc., from the memory card 115, and controls so that they are shown in a slideshow display. Details will be described below.

In addition, the system control unit 112 also performs display of other applications inside the TV receiving apparatus 100, and control of displaying of a message, operation panel, etc. When there is a request to print image data of a digital camera, etc., the system control unit 112 recognizes and controls the printing apparatus 200 connected to the interface unit 116, and prints the requested image data.

Further, the system control unit 112 controls the display superimposing control section 108, performs composition of image data from the graphic control unit 109, etc., and various information display processing, etc., of correction, etc., and displays on the display unit 110. In the same way, the system control unit 112 controls the audio control unit 107, performs composition of audio and control of output, and performs control of output to the audio output unit 111. In addition, the system control unit 112 controls transmission and reception of data with the remote control apparatus 150 operated by the user, who is a viewer, and, based on the data, performs control within the TV receiving apparatus 100. The internal bus 104 is a data and control bus, and, as described above, is a bus set up in the TV receiving apparatus 100 for use in transferring image data and audio data, as well as in transferring of information of each department.

Figure 3:
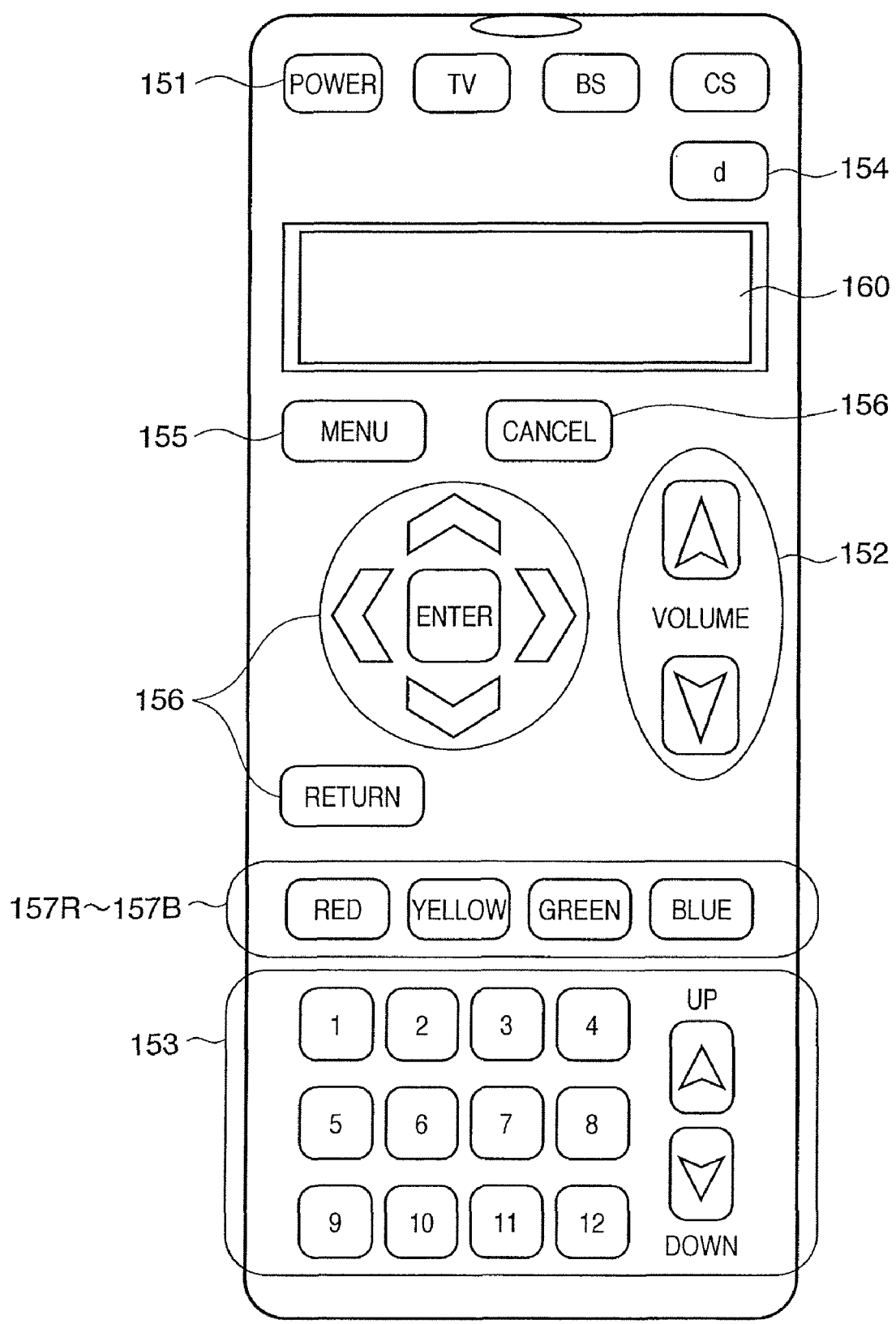
FIG. 3 is a diagram showing an operating side of a remote control apparatus controlling a TV receiving apparatus used according to an embodiment of the present invention.

FIG. 3 shows details of an operating side of a remote control apparatus 150 used together with the TV receiving apparatus 100, which is an embodiment of the present invention. Key buttons of a remote control apparatus 150 are a power key 151, a volume key 152, a channel key 153, etc., which are keys used at the time of normal TV viewing. In addition, the remote control apparatus 150 has a data broadcast key 154 (abbreviated "d key" hereinafter) for use in transitioning to a data broadcast, as well as buttons for operation of applications of the TV receiving apparatus 100, such as a menu key 155, a data broadcast, and an application. Further still, the remote control apparatus 150 has a GUI, a cursor and enter key for performing operations of an operation panel, etc., as well as a cancel key 156. In addition, 157R through 157B are red, yellow, blue, and green keys, which are color keys used as function keys in the TV receiving apparatus 100. In the TV receiving apparatus 100 according to the present embodiment, they are used in a slideshow display and in setting printing images.

The red key 157R is used as a key for performing print bookmarking while slideshow display is in operation, but it is possible to switch to starting a direct print menu by switching. In addition, the remote control apparatus 150 has a display unit 160, and displays the time and various messages. The remote control apparatus 150 transfers a key code through the remote control apparatus control unit 118 of the TV receiving apparatus 100.

Figure 4:
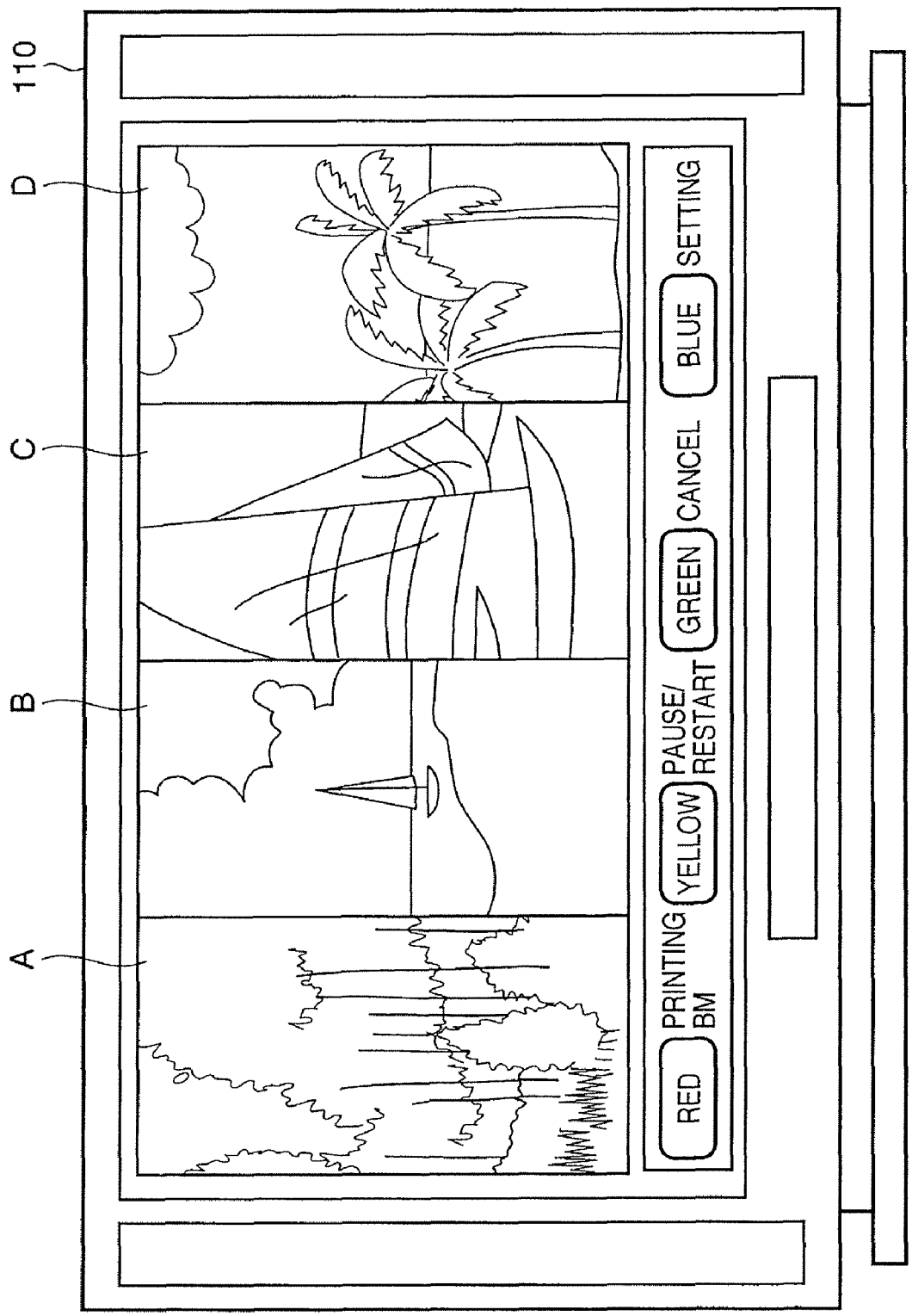
FIG. 4 is a diagram showing a strip-shaped type slideshow display executed according to an embodiment of the present invention.

FIG. 4 is a screen in the middle of a slideshow display, and, as described below, is an image representing execution of a strip-shaped type slideshow on the display unit 110. In FIG. 4, strip-shaped image data A, B, C, and D are displayed. In addition, on the bottom side of the strip-shaped image data A, B, C, and D is a user interface which can be operated by the remote control apparatus 150. In doing so, functions of the red key 157R, yellow key 157Y, blue key 157B, and green key 157G are displayed during slideshow display.

FIG. 5 is a diagram showing the hierarchical structure of software divided per each control unit of the system control unit 112 of the TV receiving apparatus 100. Reference numeral 501 is a basic system control unit including an OS, and under the management of the basic system control unit 501, other control units form a hierarchical layer structure in which a slideshow display control unit 502, a print candidate generation unit 503, a print control unit 504, and a different control unit 505 operates.

The slideshow display control unit 502 generates a display data table described below based on operations and settings by a viewer, and, based on the display data table, generates a display state table described below. The print candidate generation unit 503 generates a print candidate list based on operation of a print bookmark, which is an output command from the viewer, during a slideshow display, and stores the print candidate list in a data accumulation unit 113. The print control unit 504 selects print image data from the print candidate list based on viewer operation. Then, the printing apparatus 200 is controlled through the interface unit 116, and prints image data of a digital camera, etc., accumulated in the memory card 115 requested by the viewer.

The different control unit 505 includes all control units including the TV receiving apparatus 100 capable of receiving a TV broadcast, controlling a data broadcast, controlling communication, controlling the display, controlling the remote control, and so on.

In the slideshow display described above, a display control unit inside the different control unit 505 reads out image data accumulated in the memory card 115 based on the above display state table. Then, the display control unit controls the graphic control unit 109, the display superimposing control section 108, and the slideshow display.

FIGS. 6A and 6B are display data tables in which are described image data to be displayed and display information, control information, and print setting information during slideshow display. The display data table of FIG. 6A includes a common display information 601 of a slideshow display, while FIG. 6B includes an individual display information 602 of each image data. The common display information 601 comprises the following five items: image display format, display interval, display order, transition effect and print mode. In these items are reflected the contents set by the user using the remote control apparatus 150 before the start of displaying a slideshow.

Besides displaying a normal slideshow in which one image per one screen is successively displayed, other slideshow display formats are possible, such as displaying a strip-shaped type slideshow with two or four images per one screen. Displaying a strip-shaped type slideshow means randomly extracting one image data, and lining up in a strip-shaped form and displaying the extracted image data as described in FIG. 4.

According to a first embodiment of the present invention, as in a display state 703 shown in FIG. 7C described below, the display screen of the display unit 110 is divided vertically into four, and images are displayed in order starting with image A. Described below is the case of performing operations to display a strip-shaped type slideshow so that, when all four images have been displayed, the next image overlaps the first image. A randomly superimposing type slideshow display is a display format in which, as in a display state 803 described below and shown in FIGS. 8C and 8D, a plurality of images are strewn across the entire screen and displayed. The display position of each image is randomly computed and decided by the slideshow display control unit 502.

In addition, these display intervals are time intervals until starting display of the next image in a slideshow display. During these time intervals, the display is in a pause state. The display interval is set according to user preferences. According to the embodiment of the present invention, the time interval is set to 3 seconds. The display order of images desired to be in the slideshow display can be selected from among file name order, shooting date order, and random.

A transition effect is a manner in which an image appears when displaying the next image after the present image. According to the embodiment of the present invention, transition effects such as slide-in, dissolve, and wipe are available.

A print mode is a setting mode for automatically selecting print candidate images when performing print bookmarking for printing in a slide show display. It is possible to select from among three print modes: print candidate selection mode 1, print candidate selection mode 2, and direct print mode.

Here, the print candidate selection mode 1 is based on the assumption that the image which the user wishes to print is among the images displayed while the print bookmark button is being pressed. And, during print bookmarking, if the slideshow display is not dynamically changing, each image comprising that composite image, as well as the entire slideshow, becomes a print candidate. In addition, if the slideshow display is dynamically changing, each image comprising each slideshow display before and after change, as well as the entire slideshow (composite image) becomes a print candidate. That is, a composite image including images that have been newly added and displayed by a dynamic change, and a composite image before the dynamic change and do not include this added image are included as print candidates.

The print candidate selection mode 2 is based on the assumption that, in addition to the above print candidate selection mode 1, when print bookmarking, there is at least one of each image which comprises the display in an entire slideshow display other than the current slideshow display. That is, all other slideshow displays in which each "currently viewable" image at the time the print bookmark button (which is an output command) is pressed are print candidates. In this case, not only slideshow display images before the time the print bookmark button is pressed is considered to be a print candidate. That is, after the time at which the print bookmark button has been pressed, and the slideshow display has advanced, slideshow display images up until the time that all images that were displayed until the time of print bookmarking are "hidden and cannot be seen, or disappeared" are also print candidates.

The direct print mode is a mode of performing printing, at the time a bookmark key has been pressed, by pausing displaying of a slideshow, making the image immediately before and the image included in it a print candidate, and starting a print menu screen.

On the other hand, as an individual information of each individual image of a display data table, there is described for each image, as shown in reference numeral 602 of FIG. 6B, image file name, storage location, display order of each individual image, extraction location, extraction size, overlap with other images when displaying, display location, image rotation angle, and magnification ratio. These settings have been computed by the slideshow display control unit 502, before starting a slideshow display, based on settings of display state input by a user using the remote control apparatus 150 as well as images selected to be displayed.

Figure 7C:
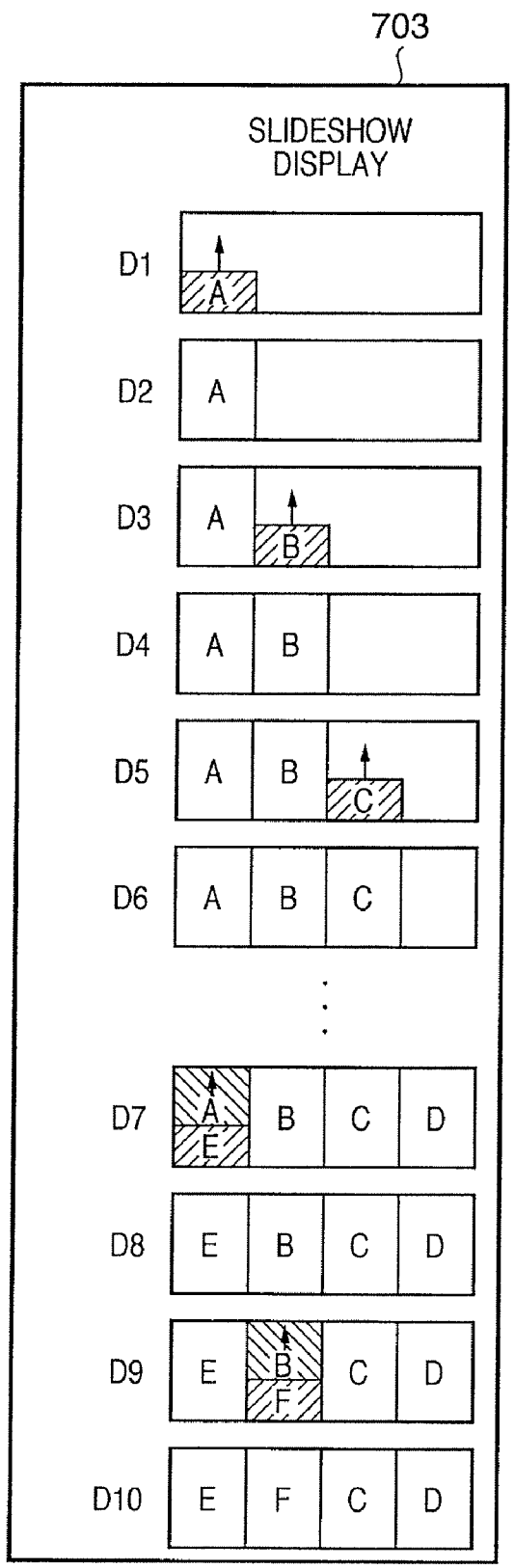

FIG. 7B is a display state table 702 in the case of a strip-shaped type slideshow display. FIG. 7C is the display state 703 of a display screen. The display state table 702 describes images (all images other than those images which are below the other images and which are not displayed) related to the present display inside the individual display information 602 as well as their state. As a result, to the display state table 702 of FIG. 7B is added the items of display change and display state. One image of the slideshow display is generated according to the display state table 702. In addition, FIG. 7A is a common display information 701 of the slideshow display.

In the display state table 702 of FIG. 7B, display change indicates whether the display is in the middle of change. A value of "C" for display change indicates that the "display is in the middle of change". "Display is in the middle of change" is the case of "about to display from where there are no images", "viewable images are about to be deleted", or "viewable images are about to become invisible by being overlapped by display of other images". In addition, if the value of display change is "F", this indicates that the "display is not changing".

Further, the display state determines whether an individual image which comprises composite images of a slideshow display are displayed on a screen, using the standards below. That is, if the display state is "V", the individual image is in a "viewable" state. This "viewable" state in a display screen (when in a display state, a display screen at the time of finishing the change operation) based on the display state table 702 is as indicated below. That is, determination is made based on the standard above a certain level (above 20% according to the present embodiment) of the face portion of an image is shown, or above a certain level (above 50% according to the present embodiment) of the entire image is displayed.

In addition, if the display state has a value of "H", the image is in a "hidden and cannot be seen, or cannot be seen because disappeared" state, and indicates cases other than the above "viewable" case.

The display state table 702 of FIG. 7B, when starting displaying of a slideshow, is generated in the memory unit 105 inside the TV receiving apparatus 100 by the slideshow display control unit 502, and is rewritten every time there is a dynamic display change by the slideshow display control unit 502. Therefore, the newest display state is always being shown, and the display superimposing control section 108 controls the display of the display unit 110 along the display state table.

FIG. 7B shows changes of the display state table 702 starting from the time point where there is no image is displayed, then image A is displayed at the D1 time point and finally image F is displayed at the D10 time point. FIG. 7C shows the display state 703 of the screen in so doing. Images at D1, D3, D5, D7 and D9 which have a diagonal line are images (display change "C") that are going through display changes. As indicated in the common display information 701 of FIG. 7A, the display interval is set to 3 seconds, the display order is set to file name order, the transition effect is set to slide-in, and the print mode is set to print candidate selection mode 1. Therefore, there is a 3-second period, during which dynamic display is in a pause state, until the start of the next display of the new image B, image C, and image F from the D2, D4, and D8 time points.

Figure 8D:
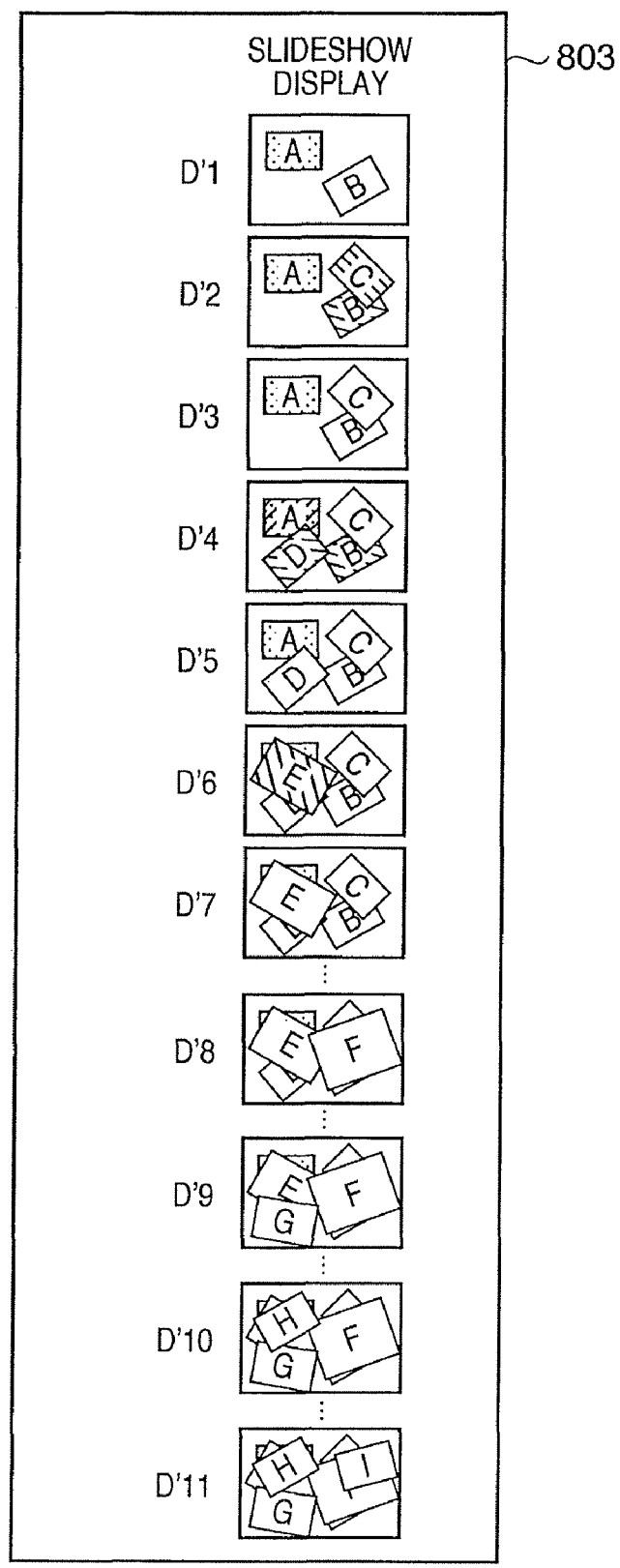

FIGS. 8A-8D show a common display information 801, a display state table 802 of a randomly superimposing type slideshow display, and a display state 803 of a display screen. The present embodiment shows a composite image starting from the time point at which image A and image B of D'1 has been displayed to the time point at which image I of D'11 has been displayed. In this randomly superimposing type slideshow display, the display state table 802 of FIGS. 8B and 8C is generated as described above. As in FIG. 7C, images with diagonal lines are images that are in the middle of change (display change "C"). In FIG. 8D, after the D'7 time point, it is difficult to show in the drawings the image state of "display is in the middle of changing", so this has been omitted.

FIG. 9A through 9D show images registered to the print candidate list as print candidate images, in the case where the user has pressed the print bookmark button, in the display state at the time points D4, D5, D6 and D9 during the operation of the strip-shaped type slideshow display of FIG. 7C. That is, in the case where the print bookmark button has been pressed at the D4 time point, image A, image B, and the composite image of image A and image B become the print candidate image. The composite image of the actual image A and image B are displayed in the left half of the display unit 110, but during printing, a composite image which has been stretched in the width direction becomes the print candidate image. Therefore, at time points D4, D5, D6, and D9, 3, 5, 4, and 7 print candidates screens, respectively, are registered.

Figure 10:
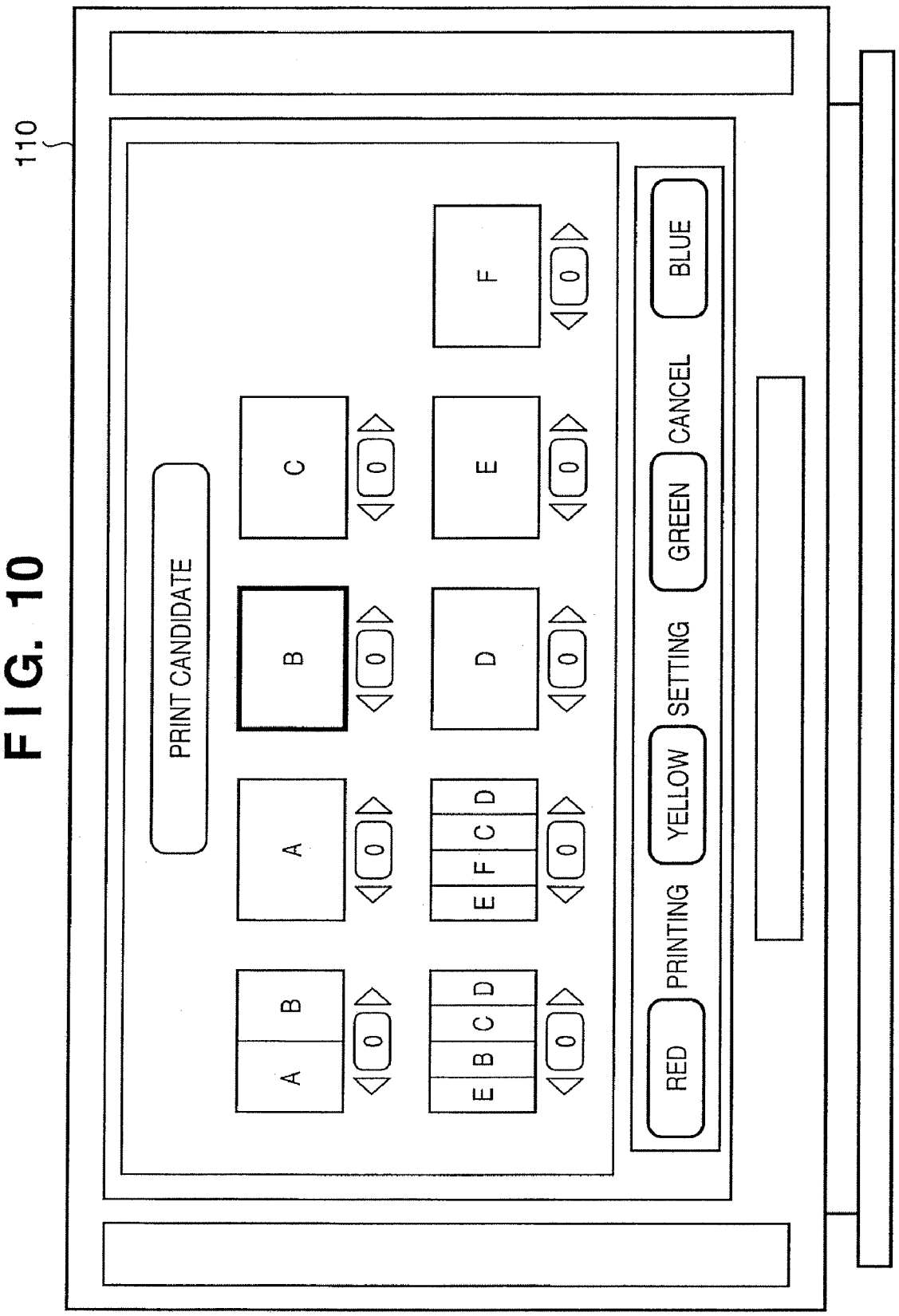
FIG. 10 is a diagram showing a state of displaying in a list registered print candidate images after finishing displaying of a strip-shaped type slideshow display executed according to an embodiment of the present invention.
Figure 11A:
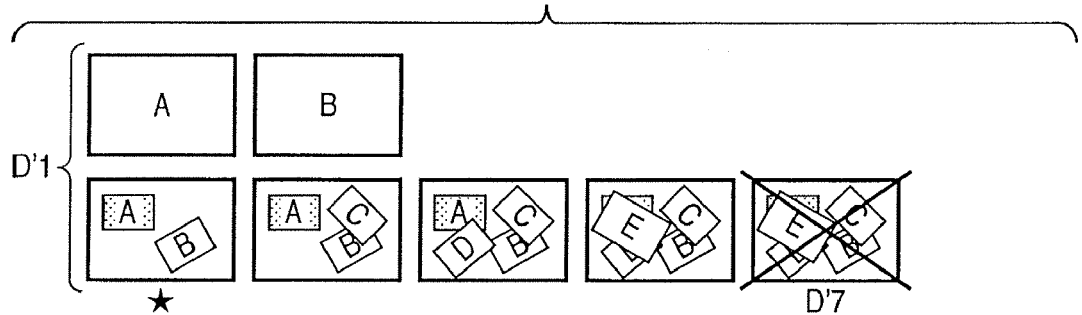
FIGS. 11A-11D are diagrams showing registration of print candidate images in a randomly superimposing type slideshow display executed according to an embodiment of the present invention.
Figure 11B:
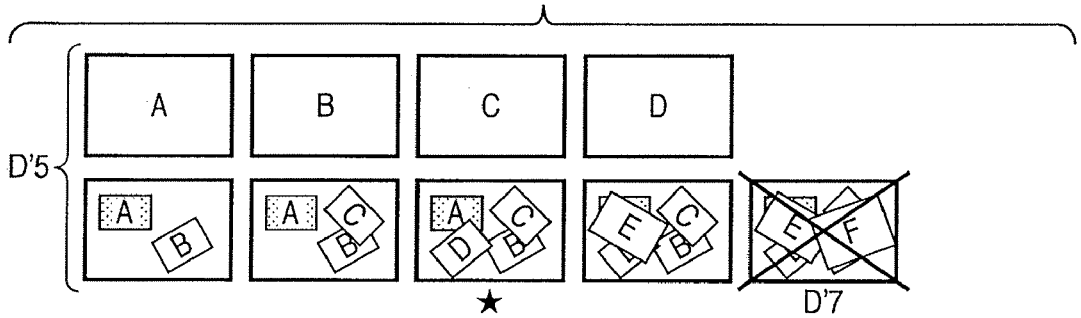
Figure 11C:
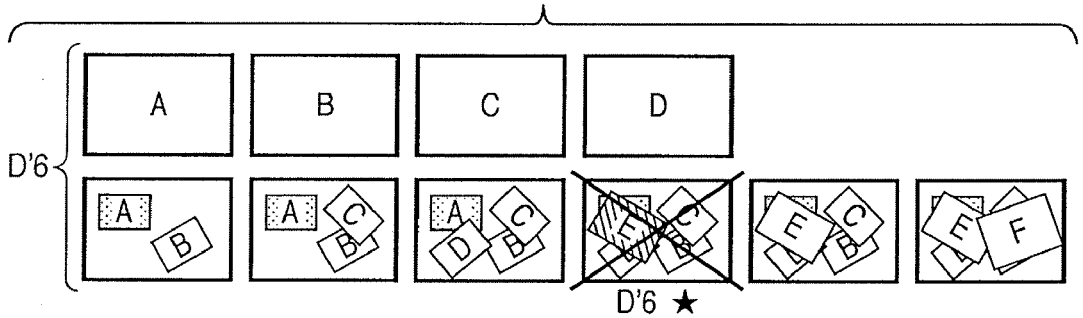
Figure 11D:
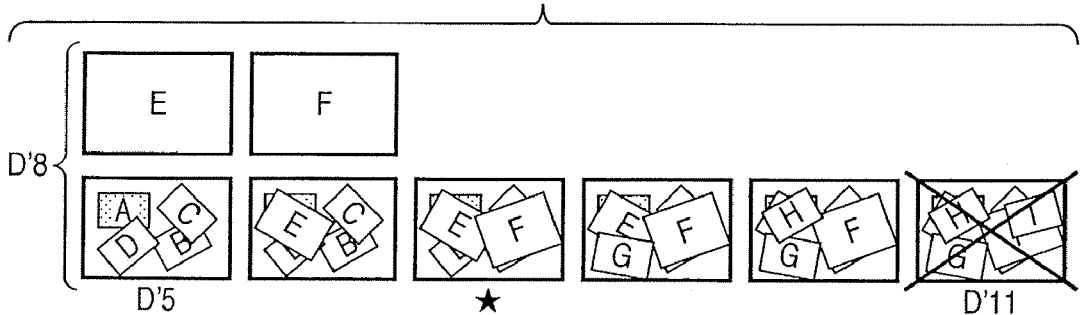

FIG. 10 shows an example of an image which is displayed on the display unit 110 of the TV receiving apparatus 100 when performing printing operation, after finishing slideshow display by pressing the print bookmark button at the time of displaying at the two time points D4 and D9 of FIG. 7C. Here, the print candidate images registered at the D4 time point and the D9 time point are displayed in a list so that it is possible for a user to select an image to be printed as an option.

FIGS. 11A through 11D show display images registered to the print candidate list as print candidate images in the case where the print book mark button has been pressed in the display state of the time points D'1, D'5, D'6 and D'8, during the operation of a randomly superimposing type slideshow display of FIG. 8D.

Figure 12:
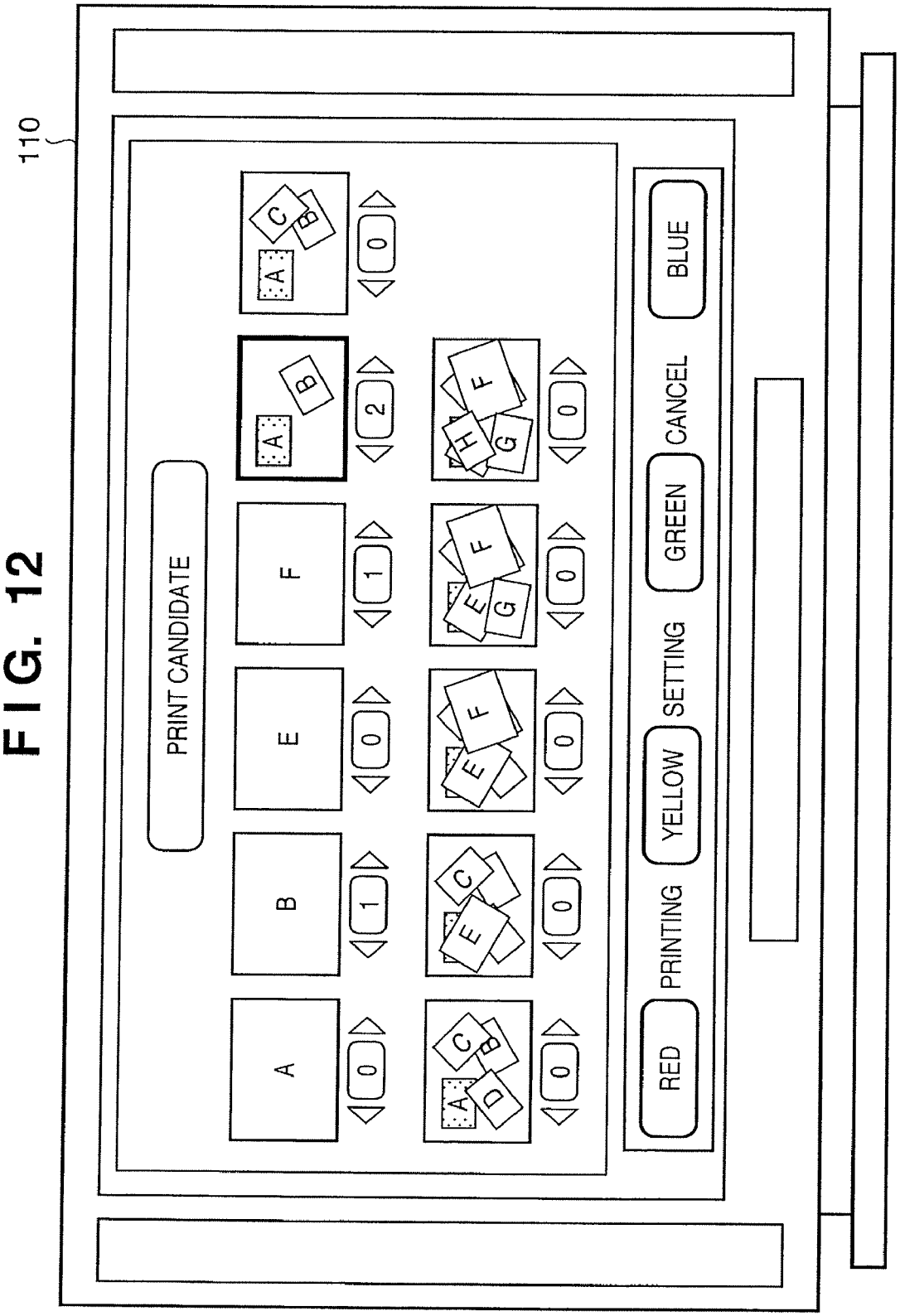
FIG. 12 is a diagram showing a state of displaying in a list registered print candidate images after finishing displaying of a randomly superimposing type slideshow display executed according to an embodiment of the present invention.

FIG. 12 shows a list of images which are print candidate images which were displayed on the display unit 110 and which were registered when the print bookmark button was pressed twice when displaying the D'1 and D'8 of FIG. 8D.

Next, a buffer memory related to a table used in the present embodiment will be described. A print candidate buffer is for temporarily storing a display state table which has the possibility of being a print candidate, and is generated in the memory unit 105 by the slideshow display control unit 502. In addition, a display image list is a list for registering individual images (those with display state "V"), namely, print candidate images, determined to be the "viewable" images inside slideshow display images. These are generated in the data accumulation unit 113 as required when a print bookmark button has been pressed, and are used together with a print candidate list at the time of displaying print candidate images. Further, a print candidate list is for selecting and storing, from a print candidate buffer, a display state table including images which are print candidates, by the print candidate generation unit 503. The print candidate list is generated in the data accumulation unit 113 and is used when printing.

First Embodiment

Next, an operation according to a first embodiment, in the case of using a strip-shaped type slideshow display, will be described using FIGS. 7A-7C and FIG. 13 through FIG. 15.

Figure 13:
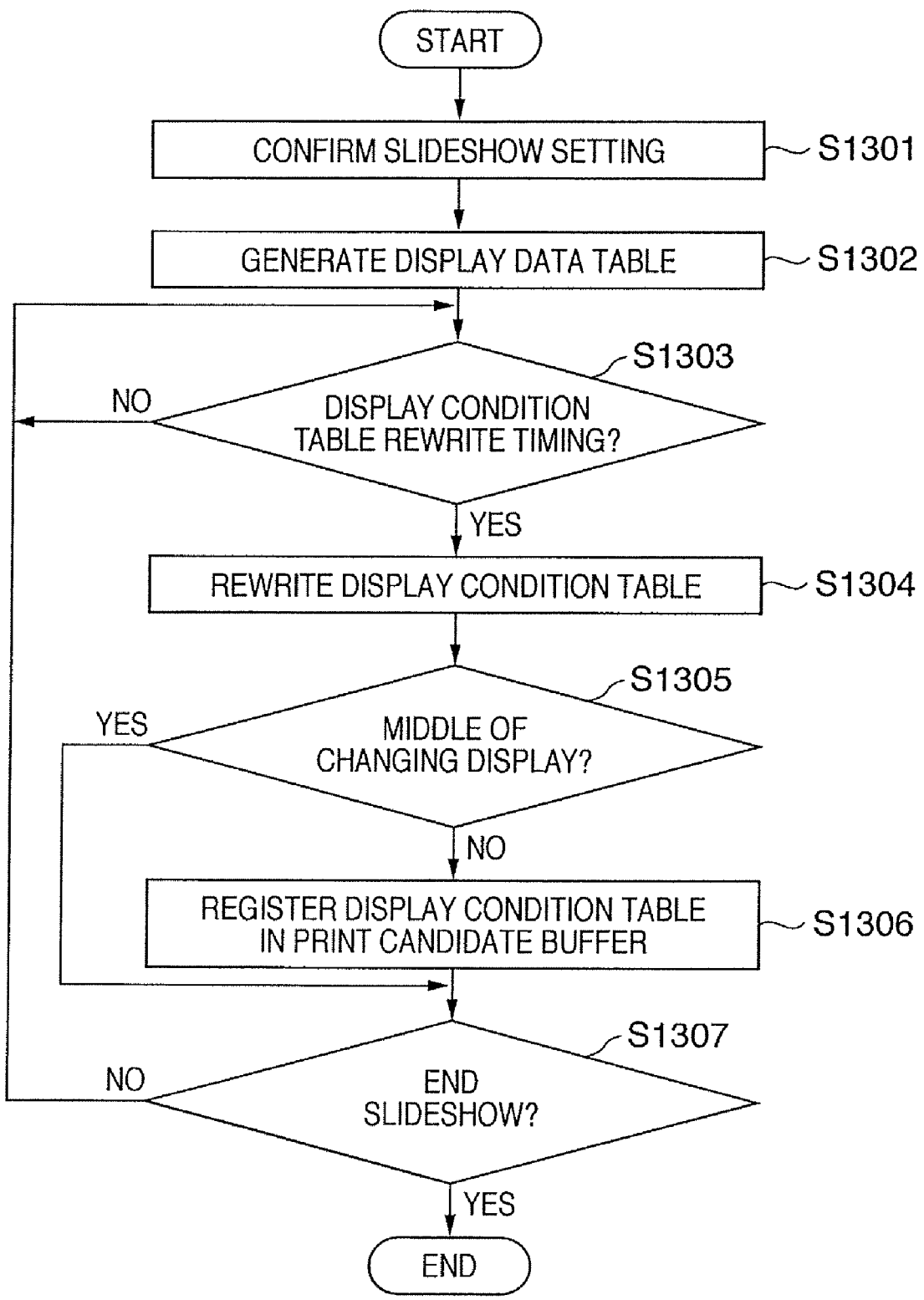
FIG. 13 is a flowchart diagram showing a registration operation of a print candidate image according to a first embodiment of the present invention.

After a user has set, using the remote control apparatus 150, the image data and the parameters such as the display format of the slideshow display, transition mode, and display interval, slideshow display is executed. FIG. 13 shows the operation flow of control of a slideshow display.

After starting processing, the slideshow display control unit 502 confirms a setting value at Step S1301, and generates a display data table at Step S1302. At Step S1302, a display state table for display control is generated based on the generated display data table, and at Step S1303 a determination is made as to whether it is a rewritten timing based on a display interval in the common display information 701. If it is a timing at which rewriting occurs, the process advances to Step S1304 and rewriting occurs. If not at a timing at which rewriting occurs, waiting occurs until it is at a timing at which rewriting occurs. Therefore, during this interval, dynamic display is in a pause state.

Next, at Step S1305, the rewritten display state table checks the state of "display change" and, if "there is no display change", that is, if the display state table is comprised by "display change 'F' state", the process advances to Step S1306. Then, the display state table is also stored in the print candidate buffer. However, if there is a display change, that is, if there is even one "display change 'C'", storage to the print candidate buffer is not performed. After storing the display state table in the print candidate buffer, the process advances to Step S1307, and a determination is made as to whether a slideshow display ends. If not, the process returns to Step S1302, the next timing at which the display is rewritten is determined, and rewriting to the "next display state table" is performed at Step S1304. Then, at Step S1306, the "next display state table" is additionally stored in the print candidate buffer. This processing sequence is performed until slideshow display is finished.

In displaying a slideshow, a display control unit within another control unit 505 detects that a display state table has been rewritten, and, based on the display state table, performs display control and performs slideshow display.

Figure 14:
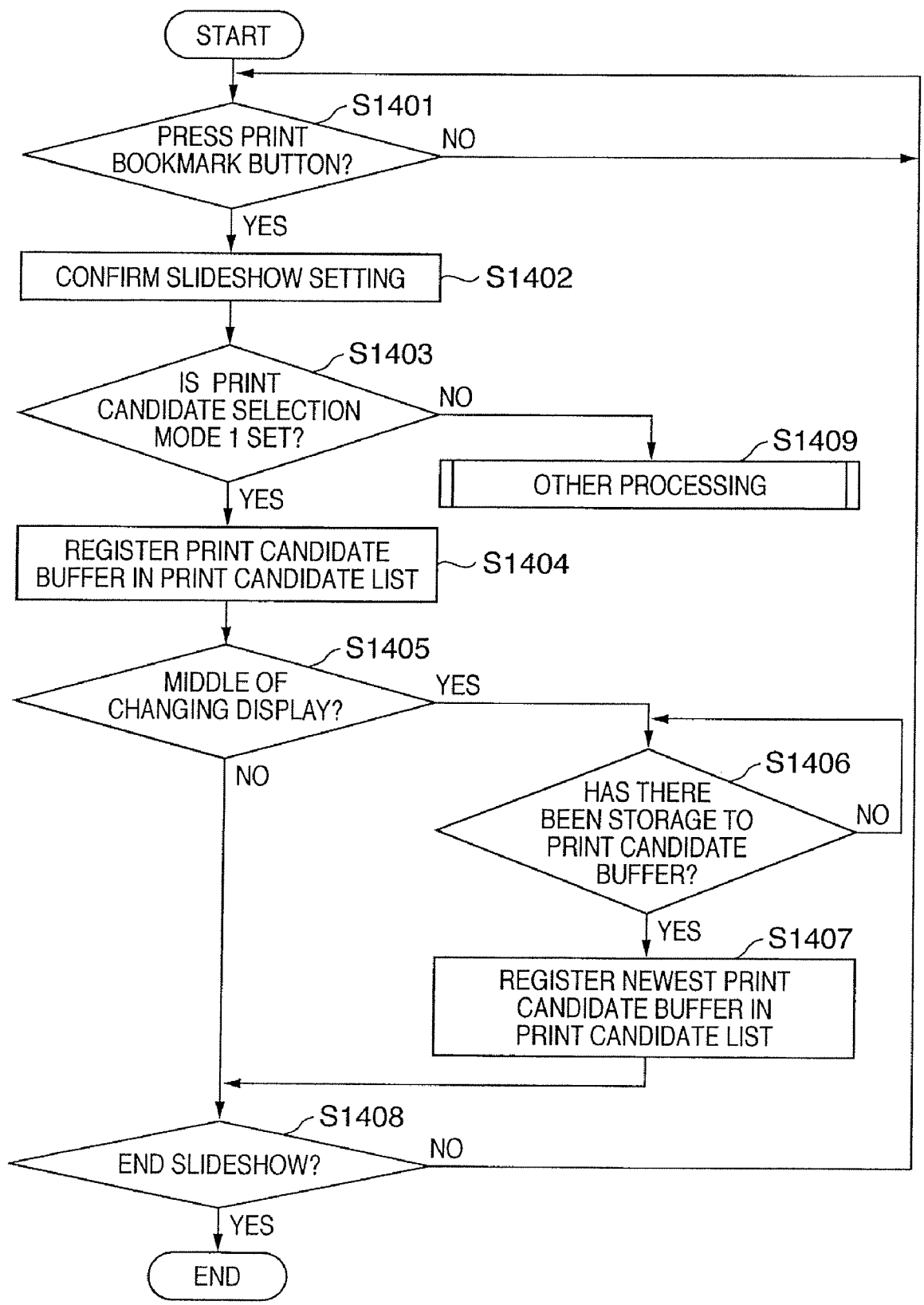
FIG. 14 is a flowchart diagram showing a registration operation of a print candidate image according to a first embodiment of the present invention.

FIG. 14 is an operation flow of the print candidate generation unit 503, and this processing routine starts processing when slideshow display is started, and pressing of the print bookmark button (e.g., the red key 157R of the remote control apparatus 150) at Step S1401 is first waited for.

Here, when a user who is viewing a slideshow presses the print bookmark button (for example, red key 157R of the remote control apparatus 150) to perform print image registration, this is received as an output command. Then, the print candidate generation unit 503 confirms the setting value of the slideshow display at Step S1402. And, if at Step S1403 the print mode is determined to be a print candidate selection mode 1, the newest display state table registered in the print buffer at Step S1404 is registered in the print candidate list. Next, the process advances to Step S1405, and whether the current display state is in the middle of "display change" is checked. If in the middle of a "display change", the process advances to Step S1406, at which there is waiting for generation of storage operations to the print buffer from the display state table. Here, if a storage operation is generated, the process advances to Step S1407, and the stored display state table is registered in the print candidate list. After registration, the process advances to Step S1408, and whether displaying of the slideshow is finished is confirmed. If not finished, the process returns to Step S1401, and the next pressing of the print bookmark button is awaited.

At Step S1405, in the case of not being in the middle of a "display change", the process advances to Step S1408, and it is confirmed whether slideshow display is finished. If it is not finished, the process returns to Step S1401, and the next pressing of the print bookmark button is awaited. In addition, by the determination at Step S1403, if the case is not print candidate selection mode 1, the process advances to Step S1409, and processing of a different mode is performed.

In addition, in the case where the print bookmark button has been pressed at a timing other than Step S1401 of this operation routine, the process at any time returns to Step S1401, and restarts operations. In this way, viewing of the slideshow and selection of images desired to be printed is advanced.

Figure 15:
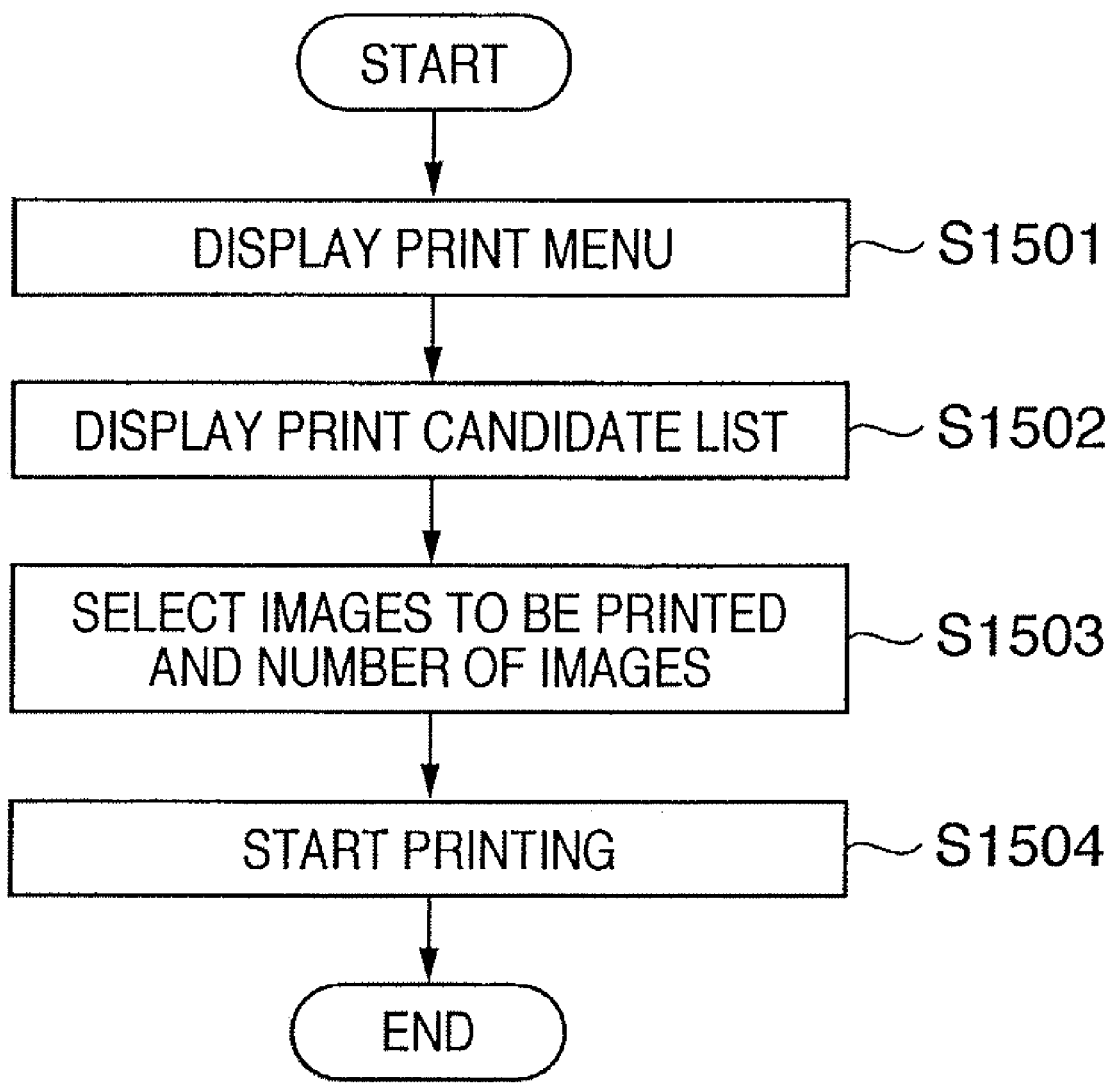
FIG. 15 is a flowchart diagram showing a printing operation according to the first embodiment and a second embodiment of the present invention.

FIG. 15 is an operation flow of the operation routine when performing printing. Slideshow display is finished after finishing selection of images desired to be printed, and the user, in order to print images that have been print bookmarked using the slideshow display, uses the remote control apparatus 150 to open the menu screen at Step S1501 and displays the print menu. Further, when a button to display a list of print candidates is pressed, the process advances to Step S1502, and display of the list of print candidates is performed. Then, further, the process advances to Step S1503, at which there is a check of print state table by the print candidate list, and the print candidate image is determined.

Here, FIGS. 9A-9D will be referenced in describing the determination of the print candidate when the print bookmark button is pressed at a plurality of timings.

FIGS. 9A-9D show print candidate images at, respectively, the time points D4, D5, D6 and D9 of FIG. 7C. in the case that the print bookmark button has been pressed. The images containing the ★mark on the right side of D4, D5 and D9 are slideshow display images at a timing at which the print bookmark button has been pressed. An X mark, added for description purposes, are composite images that are not print candidate images.

As described before, FIG. 9A shows the case in which the print bookmark button has been pressed at the D4 time point of FIG. D4. In this case, the content (the display state table 702 at the D4 time point of FIG. 7C) of the newest print candidate buffer at the D4 time point is stored in the print candidate list. This D4 time point is a timing at which there is no display change. Therefore, the individual images (image A and image B) inside the display state table 702 at the D4 time point, and the composite image of image A and image B of the slideshow display, comprising the display state table 702, become print candidates without waiting for the print candidate buffer to be stored again.

In this case, if the composite image of the slideshow display is to be made the print candidates without change, it becomes the image on the right with the X mark. However, in the case of displaying a strip-shaped type slideshow, the print candidate image will correspond to a composite image that has been stretched sideways, as without the stretching, the total balance will be poor.

Figure 9A:
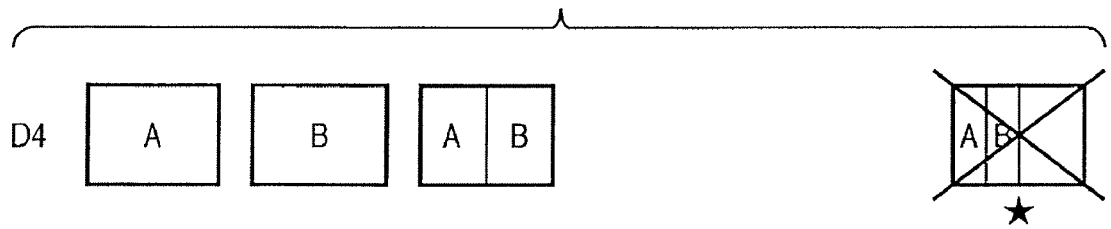
FIGS. 9A-9D are diagrams showing registration of print candidate images in a strip-shaped type slideshow display executed by an embodiment according to the present invention.
Figure 9B:
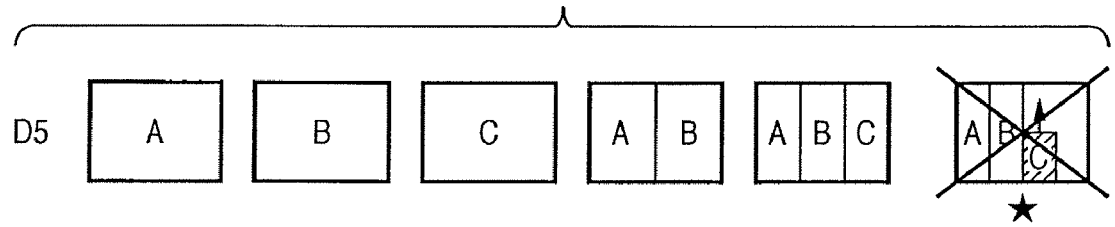

FIG. 9B shows the case of pressing the print bookmark button at the D5 time point of FIG. 7C. In this case, the newest print candidate buffer content (the display state table 702 of the D4 time point of FIG. 7C) at the D4 time point will first be stored in the print candidate image list. This D5 time point is a timing of display changing, so storage to the print candidate buffer of the display state table 702 at the next D6 time point is awaited, and the stored newest print candidate buffer content (the display state table of the D6 time point of FIG. 7C) is also registered in the print candidate image list.

Figure 9C:
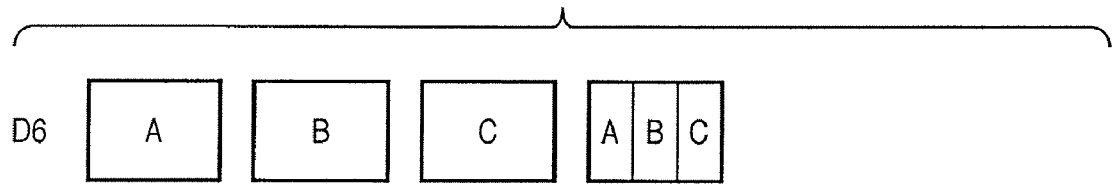

FIG. 9C shows a print candidate image corresponding to the D6 time point, and the print candidate image of the D5 time point of FIG. 7C is an image included in either the print candidate image at the D4 time point, or at the D6 time point. That is, it becomes like FIG. 9B, and the image (the image with the X mark on the right side of FIG. 9B) during the display change at the timing of pressing the print bookmark button does not become a print candidate.

Figure 9D:
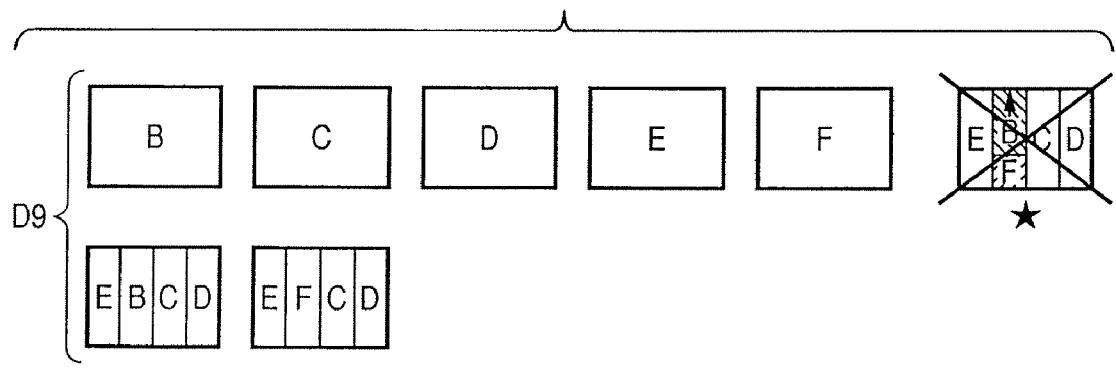

FIG. 9D is a print candidate image in the case of pressing the print bookmark button at the D9 time point of FIG. 7C. In this case, in the same way as described above, the composite image of the slideshow display at the timing of pressing the print bookmark does not become a print candidate, and instead the composite image of the slideshow display which does not change at the display timing of before and after D8 and D10, as well as the individual images comprising the composite image, become the print candidate.

FIG. 10 shows an image in the case of displaying on the display unit 110 of the TV receiving apparatus 100 a displayed image comprising print candidate images collectively in the case in which the print bookmark button has been pressed at the D4 and D9 time points of FIG. 7C.

In this way, at Step S1502, as shown in FIG. 12, the decided print candidate image is made to be a selection option of an image to be output, and is displayed in a list so that it can be selected by a user. From here, the process advances to Step S1503, and the print candidate image and the number to be printed is selected. After the print images are decided in this way, the red key 157R of the remote control apparatus 150 assigned to the print start button is pressed, and printing at Step S1504 is performed. In this case, if the details of printing are desired to be set, detailed items are selected by the yellow key 157Y of the remote control apparatus 150.

Second Embodiment

Figure 16:
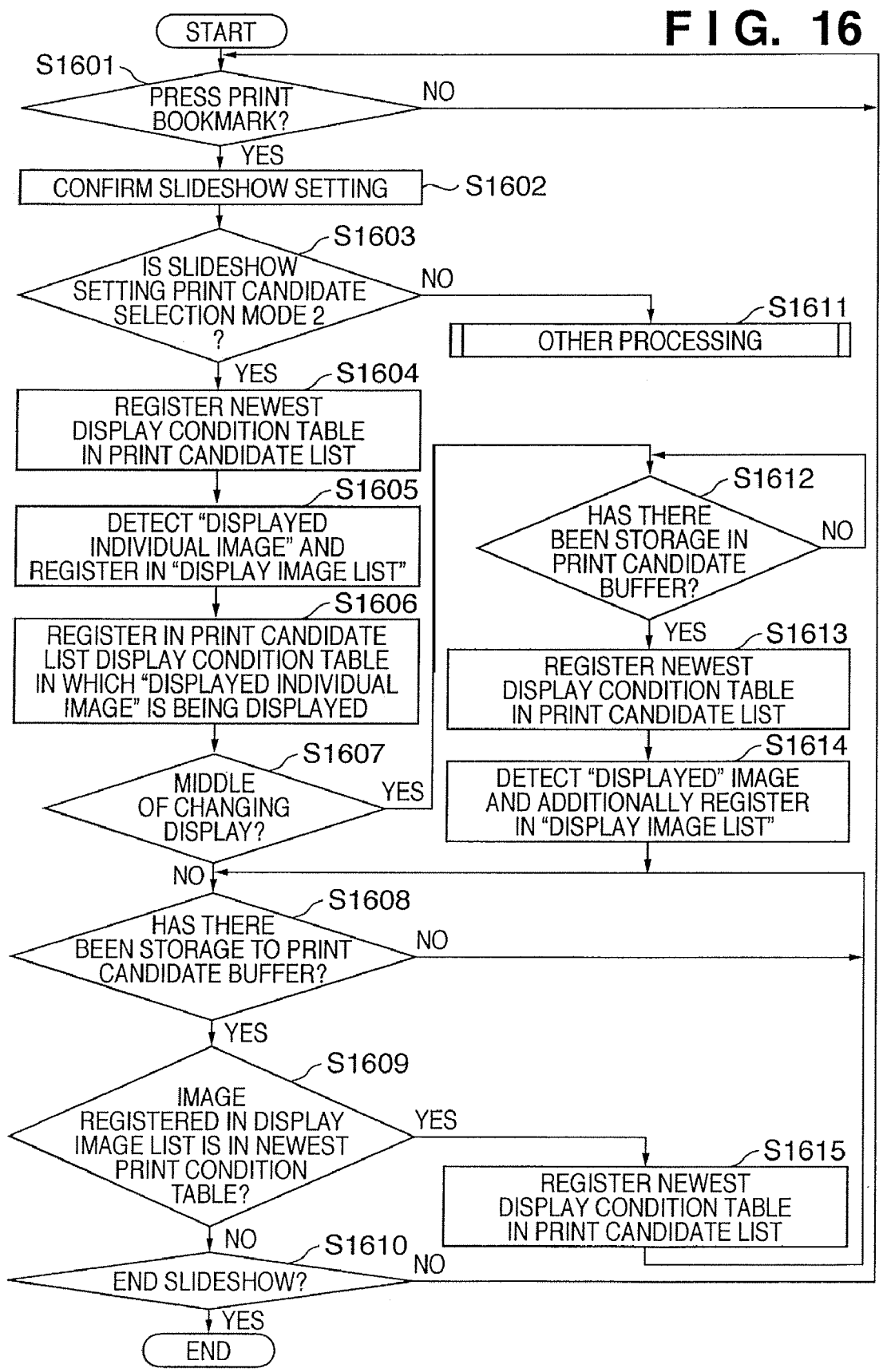
FIG. 16 is a flowchart diagram showing a registration operation of a print candidate image according to the second embodiment of the present invention.

In the first embodiment, print candidate images were set to be individual images "viewable" at the time of pressing the print bookmark button, or individual images "viewable" at the time of pressing the print bookmark button and slideshow displays before and after the time of pressing the print bookmark button. However, in the second embodiment, the case of applying the print candidate selection mode 2 when displaying a randomly superimposing type slideshow display shown in FIG. 8D, will be described together with the flow of the process of operation in FIG. 16.

The operation of the second embodiment is an example of making all images of other slideshow displays included in "viewable" individual images at the time of pressing the print bookmark button, as print candidates.

In this case, not only before the pressing of a print button, but also after pressing of the print button and the slideshow display is advanced further, images of a slideshow display until all individual images immediately after the print button is pressed and which are "viewable" become "hidden and not viewable, or disappeared".

First, the slideshow display advances, and, at some time point, the user presses the print bookmark button using the remote control apparatus 150. After starting processing, when pressing of the print bookmark button is detected at Step S1601, the setting content of the slideshow display is confirmed at Step S1602. Subsequently, the process advances to Step S1603, at which step the selection mode of the determination of print candidates is checked. If the selection mode of the determination of the print candidate is print candidate selection mode 2, the process advances to Step S1604, and the newest display state table of the print candidate buffer is registered in the print list. However, if not a print candidate selection mode 2, other processing is performed at Step S1611.

In the case of print candidate selection mode 2, after performing registration processing at Step S1604, the process advances to Step S1605. Then, by the display state table, the "viewable" individual images are checked, and registered in the display image list. Further, at Step S1606, it is checked whether individual images registered in the display image list is in a "viewable" state in a slideshow display image generated by all by all other display state tables in the print candidate buffer. Any display state table with at least one image in a "viewable" state is registered in the print candidate buffer.

Next, the process advances to Step S1607, where it is checked if the present slideshow display is in the "display is in the middle of change" state. If "display is in the middle of change", it is investigated at Step S1612 whether there has been storage to the print candidate buffer by the slideshow display control unit 502. Then, in the case where there has been storage, the process advances to Step S1613, and the newest display state table stored in the print buffer is added to the print candidate list. The process then advances to Step S1614, "viewable" individual images are detected, and the individual images are additionally registered in the display image list. Then, after this, whether there has been storage to the print candidate buffer is checked at Step S1608, and, if there has been storage, the process advances to Step S1609.

At Step S1609, it is determined whether there is displayed in the newest display state table stored in the print candidate buffer, "viewable" individual images in the display image list. And, if there is any "viewable" individual image, the process advances to Step S1615, and added to the print candidate buffer. At Step S1607, in the case of not being in a "display is in the middle of change" state, the same operation as described above is performed.

Then, the process returns to Step S1608, and re-storage to the print candidate buffer is awaited. When individual images are no longer detected in the display state table, it is checked at Step S1610 whether slideshow display is finished or not. If not finished, the process returns to Step S1601 of detecting the print bookmark button.

In addition, if the print bookmark button is again pressed in the middle of the operation routine of the randomly superimposing type slideshow display, the process is canceled, and operation from Step. S1601 is again performed. However, in this case, the content of the print candidate list and the display image list remains as is.

In addition, if finished in the middle of operation of the randomly superimposing type slideshow display, the display is finished at that time point, storage to the print image buffer is also finished, and generation of a print candidate list is also finished at this point. In this way, when slideshow display viewing is finished, operation is performed according to FIG. 15, as in the first embodiment. That is, as shown in FIG. 15, after starting processing, the user first selects the print button from the print menu displayed at Step S1501, and selects the print candidate button. Then, the process advances to Step S1502, where the state image of the slideshow display based on the "viewable" individual images from the display image list, and the display state table from the print candidate list is reproduced, and displayed as a print candidate image.

FIG. 12 shows the display candidate image displayed on the display unit 110 of the TV receiving apparatus 100, when the print bookmark button has been pressed at both the D'1 and D'8 time points of FIG. 8D. This print candidate image is an image included in either FIG. 11A or FIG. 11D. After listing the print candidate images, the images desired to be printed and the number of prints is selected at Step S1503, and printing is started at Step S1504. In addition, in FIGS. 11A-11D, images with an X mark are not registered as print candidate images.

Other Embodiments

Figure 17:
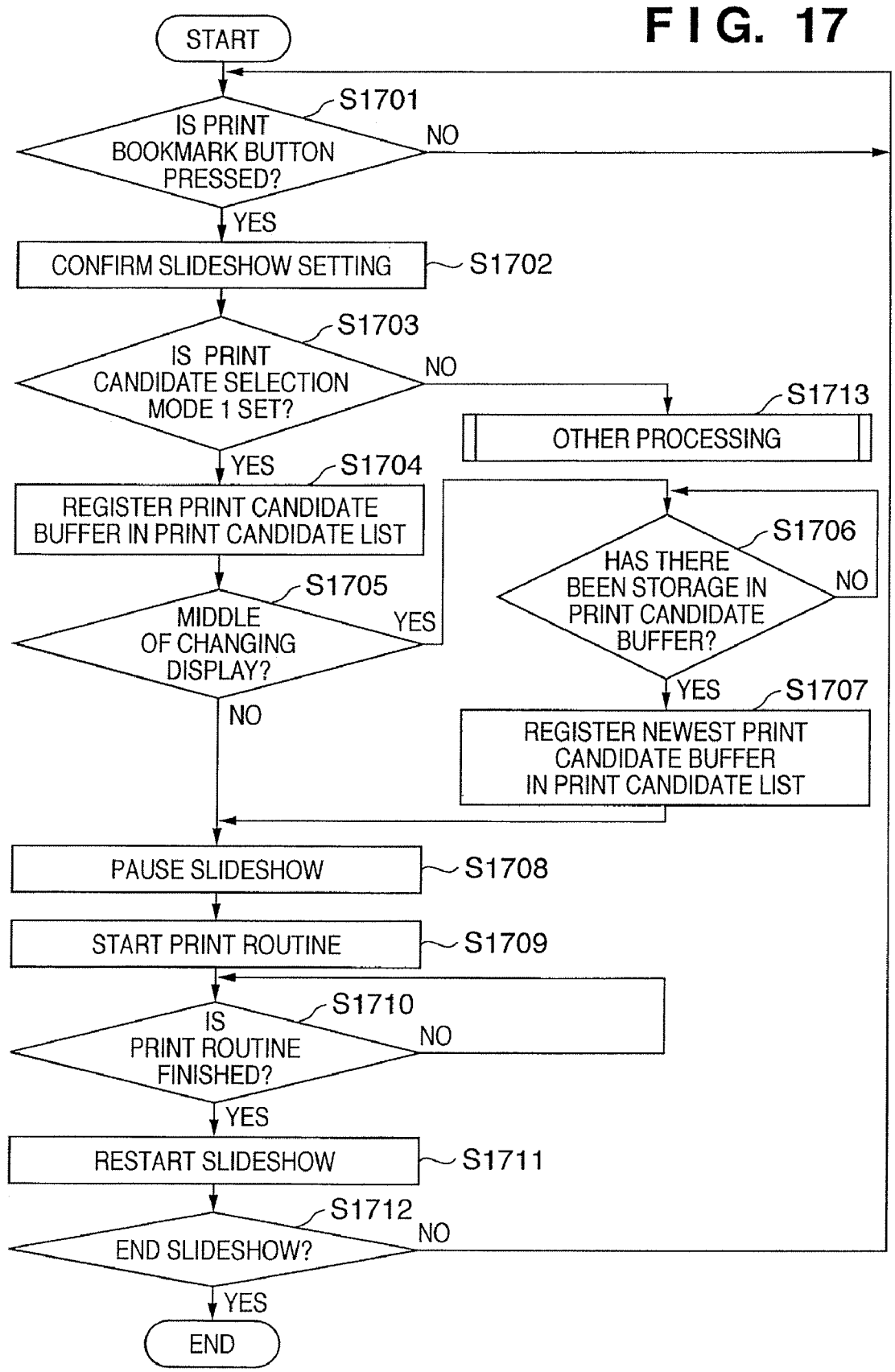
FIG. 17 is a flowchart diagram showing an operation according to other embodiments of the present invention.

In the first and second embodiments above, print bookmarking is performed during the display of a slideshow, and, after finishing slideshow display, the images that are print candidates are displayed at once, and, of those images, the print image is selected. However, during the setting of the slideshow display, the print candidate selection mode is set to "direct printing". Then, by the print candidate determination procedure of the print mode selection mode 1, each time the print bookmark button is pressed, the display operation of the slideshow display is paused, and a mode to display the print candidate screen is prepared. A flow showing the operation in this case is shown in FIG. 17.

Description of parts that overlap with parts of the former embodiments 1 and 2 will be omitted. That is, the operation from the pressing of the print bookmark button to Steps S1701 through S1707 are the same as the first embodiment. However, after this, a pause is instructed against the slideshow display control unit 502 at Step S1708, and, after that, the print start routine is started at Step S1709. The print start routine S1709, in here, displays as a print candidate image registered in the print list, and performs printing operations. In addition, at Step S1713 is processing of other modes, as in the above embodiments.

After this, the slideshow display control unit 502 checks whether the print routine is finished at Step S1710. Here, if it is detected to be finished, the process advances to Step S1711, outputs an instruction to restart slideshow display, and continues slideshow display until the slideshow is finished at Step S1712. By doing so, it is possible to print while viewing a slideshow.

The above embodiments of the present invention were described in terms of displaying a strip-shaped type slideshow and a randomly superimposing type slideshow display, but it is possible to apply the present invention to slideshow displays of different formats. Moreover, individual images which make up a composite image are formed not only by images from various image information sources, but it is also possible to use the individual images mixed with images from various image information sources such as broadcast signals, video information from DVD, and video information accumulated in an HDD apparatus.

In addition, the object of the present invention can also be achieved by supplying, to a system or an apparatus, a storage medium on which is recorded program code of software implementing the functions of the above embodiments. That is, it is needless to say that the above object can be achieved by reading out and executing program code stored in a storage medium by a computer (or CPU or MPU) of that system or apparatus. In this case, program code itself which has been read out from the storage medium realizes the function of the above embodiments, and the storage medium storing that program code makes up the present invention.

As a storage medium for supplying program code, it is possible to use, for example, a flexible disk, hard disk, optical disc, magnetic optical disk, CD-ROM, CD-R, electromagnetic tape, non-volatile semiconductor memory card, or ROM. In addition, there is a case in which the functions of the above embodiments are realized by executing program code read out by a computer.

However, further, it is needless to say that the above embodiments include the case where, based on instructions of program code, an OS (operating system), etc., operating on a computer performs part or all of the actual processing.

Further, it is also possible that program code that has been read out from a storage medium can be written into memory equipped to a function expansion board inserted in a computer or a function expansion unit connected to a computer. Needless to say, the embodiments include the case of a CPU, etc., equipped to that function expansion board or function expansion unit performing a part or all of the actual processing according to the program code instructions, and thereby realizing the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-221245, filed on Aug. 14, 2006, and Japanese Patent Application No. 2007-192651, filed Jul. 24, 2007, which are hereby incorporated by reference herein in their entirety.

What is claimed is:

1. An image processing apparatus, comprising:
    a display control unit configured to display on a display apparatus a composite image comprising a plurality of images, such that, in a transition period of the display, the composite image is displayed as being changed over time to include a further image and, in a stable period of the display, all of the plurality of images in the composite image are displayed as not being changed to include further images;
    a receiving unit configured to receive an output command while the composite image is being displayed on the display in either the stable period or the transition period, wherein the output command is a command to display the composite image on the display apparatus as a print candidate image;
    a determination unit configured to determine, when the output command has been received, whether the output command received by said receiving unit was received during the stable period or during the transition period and, if said receiving unit received the output command during the stable period, to determine the composite image being displayed and the plurality of images included in the composite image as the only print candidate images or, if said receiving unit received the output command during the transition period, to determine the composite image that was displayed in the last stable period, the composite image that will be displayed in the next stable period and the plurality of images included in the two composite images as the only print candidate images;
    a selection unit configured to display the print candidate images by said determination unit on the display apparatus and to select an image for outputting from among the displayed print candidate images; and
    an output unit configured to output the selected print candidate image to a printer.

2. A control method of an image processing apparatus, comprising:
    a controlling step of controlling a composite image comprising a plurality of images by displaying on a display apparatus, such that, in a transition period of the display, the composite image is displayed as being changed over time to a further image and, in a stable period of the display, all of the plurality of images in the composite image are displayed as not being changed to include further images;
    a receiving step of receiving an output command from a user while the composite image being displayed on the display apparatus in either the stable period or the transition period, wherein the output command is a command to display the composite image on the display apparatus as a print candidate image;
    a determination step of determining, when the output command has been received, whether the output command received in the receiving step was received during the stable period or during the transition period and, if said the output command was received during the stable period of the display, determining the composite image being displayed and the plurality of images included in the composite image as the only print candidate images or, if the output command was received during the transition period of the display, determining the composite image that was displayed in the last stable period the composite image that will be displayed in the next stable period and the plurality of images included in the two composite images as the only print candidate images;
    a selecting step of displaying the print candidate images determined by said determination step on the display apparatus and of selecting an image for outputting from among the displayed print candidate images; and an output step of outputting the selected print candidate image to a printer.

3. A non-transitory storage medium capable of being read by a computer and on which is recorded a program for making a computer function as each unit in the image processing apparatus according to claim 1.

\* \* \* \* \*